US009739221B2

(12) United States Patent
Madison et al.

(10) Patent No.: US 9,739,221 B2
(45) Date of Patent: Aug. 22, 2017

(54) METHOD TO IMPROVE BLOWTHROUGH AND EGR VIA SPLIT EXHAUST

(71) Applicant: Ford Global Technologies, LLC, Dearborn, MI (US)

(72) Inventors: Daniel Paul Madison, Dearborn, MI (US); Joseph Norman Ulrey, Dearborn, MI (US); Brad Alan Boyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 14/798,214

(22) Filed: Jul. 13, 2015

(65) Prior Publication Data

US 2015/0316005 A1 Nov. 5, 2015

Related U.S. Application Data

(63) Continuation-in-part of application No. 14/157,167, filed on Jan. 16, 2014, now Pat. No. 9,080,523.

(51) Int. Cl.
*F02D 41/00* (2006.01)
*F02D 41/06* (2006.01)
(Continued)

(52) U.S. Cl.
CPC ........ *F02D 41/006* (2013.01); *F01L 13/0042* (2013.01); *F01N 13/107* (2013.01); *F02B 37/02* (2013.01); *F02B 37/18* (2013.01); *F02D 13/0203* (2013.01); *F02D 13/0261* (2013.01); *F02D 35/027* (2013.01); *F02D 41/0007* (2013.01); *F02D 41/008* (2013.01); *F02D 41/0055* (2013.01); *F02D 41/062* (2013.01); *F02D 41/123* (2013.01);
(Continued)

(58) Field of Classification Search
CPC . F02D 41/0007; F02B 37/18; F02M 25/0707; Y02T 10/144; Y02T 10/47
USPC ....................................... 60/280, 602, 605.2
See application file for complete search history.

(56) References Cited

U.S. PATENT DOCUMENTS 5,791,146 A 8/1998 Dungner
5,794,445 A 8/1998 Dungner
(Continued)

FOREIGN PATENT DOCUMENTS

WO 2013111648 A1 1/2013

OTHER PUBLICATIONS

Glugla, C. "Systems and Methods for Boost Control," U.S. Appl. No. 14/307,165, filed Jun. 17, 2014, 56 pages.
(Continued)

*Primary Examiner* — Mark Laurenzi
*Assistant Examiner* — Dapinder Singh
(74) *Attorney, Agent, or Firm* — Julia Voutyras; McCoy Russell LLP

(57) ABSTRACT

Methods and systems are provided for a boosted engine having a split exhaust system. In one example, a method comprises directing exhaust from a first cylinder group to one or more of a pre-compressor location, a post-compressor location, and an exhaust turbine, and directing exhaust from a second cylinder group to one or more of the pre-compressor location, and the exhaust turbine. Engine efficiency and knock control may be enhanced by directing exhaust gases to different locations based on engine operating conditions.

20 Claims, 14 Drawing Sheets

(51) Int. Cl.

| | | |
|---|---|---|
| *F01N 3/00* | (2006.01) | |
| *F01N 13/10* | (2010.01) | |
| *F02B 37/02* | (2006.01) | |
| *F01L 13/00* | (2006.01) | |
| *F02D 41/12* | (2006.01) | |
| *F02B 37/18* | (2006.01) | |
| *F02D 13/02* | (2006.01) | |
| *F02D 35/02* | (2006.01) | |
| *F02M 26/04* | (2016.01) | |
| *F02M 26/43* | (2016.01) | |

(52) U.S. Cl.
CPC ............ *F02M 26/04* (2016.02); *F02M 26/43* (2016.02); *F02D 41/064* (2013.01); *F02D 2041/001* (2013.01); *Y02T 10/144* (2013.01); *Y02T 10/18* (2013.01); *Y02T 10/47* (2013.01)

(56) References Cited

U.S. PATENT DOCUMENTS

| | | |
|---|---|---|
| 6,595,183 B1 | 7/2003 | Olofsson |
| 7,287,378 B2 | 10/2007 | Chen et al. |
| 7,490,466 B2 | 2/2009 | Robel et al. |
| 8,069,663 B2 | 12/2011 | Ulrey et al. |
| 8,291,891 B2 | 10/2012 | Alger, II et al. |
| 8,479,511 B2 | 7/2013 | Pursifull et al. |
| 8,495,992 B2 | 7/2013 | Roth |
| 8,539,770 B2 | 9/2013 | Williams |
| 8,601,811 B2 | 12/2013 | Pursifull et al. |
| 8,701,409 B2 | 4/2014 | Pursifull et al. |
| 8,944,034 B2 | 2/2015 | Gingrich et al. |
| 2011/0000470 A1 | 1/2011 | Roth |
| 2012/0023935 A1 | 2/2012 | Pursifull et al. |
| 2012/0204844 A1* | 8/2012 | Gingrich ............ F02B 27/0215 123/568.11 |
| 2014/0360461 A1 | 12/2014 | Ulrey et al. |
| 2015/0047347 A1 | 2/2015 | Ulrey et al. |

OTHER PUBLICATIONS

Glugla, C. et al. "Systems and Methods for Purge and PCV Control," U.S. Appl. No. 14/284,904, filed May 22, 2014, 42 pages.

Ku K. et al. "Systems and Methods for EGR Control," U.S. Appl. No. 14/454,240, filed Aug. 7, 2014, 57 pages.

Glugla, C. et al., "Dedicated-EGR Cylinder with Variable Charge Motion," U.S. Appl. No. 14/454,275, filed Aug. 7, 2014, 56 pages.

Styles, D. et al., "Systems and Methods for a Modified Cylinder Firing Interval in a Dedicated EGR Engine," U.S. Appl. No. 14/458,201, filed Aug. 12, 2014, 45 pages.

* cited by examiner

| Condition | Exhaust Valve timing | Exhaust Destination |
|---|---|---|
| Engine Start | Exh_1 closed & deactivated | No exhaust gases to turbine |
| | Exh_2 opens before BDC and closes just after TDC | All exhaust directed to emission control device |
| | CIV closed & deactivated | No blowthrough to compressor inlet |
| Tip-in | Exh_1 opens just before BDC and closes well before TDC | Blowdown exhaust portion directed to turbine |
| | Exh_2 opens as Exh_1 is at maximum lift around midpoint of exhaust stroke and closes before TDC | Scavenged exhaust portion directed to emission control device |
| | CIV opens toward end of exhaust stroke before TDC and closes well after TDC overlapping with intake valves | Mix of blowthrough and LP EGR directed to compressor inlet |
| Throttled Conditions | Exh_1 opens just before BDC and closes well before TDC | Blowdown exhaust portion directed to turbine |
| | Exh_2 opens about midpoint of exhaust stroke and closes just after TDC | Scavenged exhaust portion directed to emission control device |
| | CIV closed & deactivated | No blowthrough to compressor inlet |
| Unstable combustion | Exh_1 opens just before BDC and closes well before TDC | Blowdown exhaust portion directed to turbine |
| | Exh_2 opens as Exh_1 is at maximum lift around midpoint of exhaust stroke and closes before TDC | Scavenged exhaust portion directed to emission control device |
| | CIV opens well before TDC and closes well after TDC overlapping with intake valves; fuel may be injected into blowthrough | Mix of blowthrough, LP EGR and uncombusted fuel to compressor inlet |
| Tip-out | Exh_1 opens before BDC and closes well before TDC | Blowdown exhaust portion directed to turbine |
| | Exh_2 opens as Exh_1 is at maximum lift about halfway through exhaust stroke and closes just after TDC | Scavenged exhaust portion directed to emission control device |
| | CIV closed & deactivated | No blowthrough to compressor inlet |

| MODE | | 1 | 2 | 3 |
|---|---|---|---|---|
| EXHAUST VALVES IN CYLINDERS 22, 24, AND 26 | Exh_1 status | Closed (Optional: opens just before BDC and closes before midpoint of exhaust stroke) | Open just before BDC of power stroke and closes well before TDC | Open just before BDC and closes well before TDC |
| | Exh_2 status | Opens just before BDC of power stroke and closes just after TDC of exhaust stroke (Optional: opens before Exh_1 closes and closes just after TDC of exhaust stroke) | Opens as Exh_1 is at maximum lift around midpoint of exhaust stroke and closes just after TDC | Opens as Exh_1 is at maximum lift around midpoint of exhaust stroke and closes before TDC |
| | Exh_3 status | Closed | Closed | Opens toward end of exhaust stroke before TDC and closes well after TDC overlapping with intake valves |
| EXHAUST VALVES IN CYLINDER 20 (subset of cylinders) | Exh_1 status | Closed (Optional: opens just before BDC and closes before midpoint of exhaust stroke) | Closed | Open just before BDC and closes well before TDC |
| | Exh_2 status | Opens just before BDC of power stroke and closes just after TDC of exhaust stroke (Optional: opens before Exh_1 closes and closes just after TDC of exhaust stroke) | Closed | Opens as Exh_1 is at maximum lift around midpoint of exhaust stroke and closes before TDC |
| | Exh_3 status | Closed | Opens just before BDC of power stroke and closes just after TDC of exhaust stroke | Opens toward end of exhaust stroke before TDC and closes well after TDC overlapping with intake valves |
| ERV TO POST-COMPRESSOR | | Closed | Open | Closed |
| ERV TO PRE-COMPRESSOR | | Closed | Closed | Open |
| EXHAUST DESTINATION | | All exhaust from all cylinders delivered to exhaust catalyst | Exhaust from cylinder 20 to post-compressor/post-throttle location Exhaust from cylinders 22, 24, and 26 to both turbine and exhaust catalyst | From all cylinders: Blowdown portion to turbine, scavenging portion to exhaust catalyst, and mix of blowthrough and LP EGR to compressor inlet |

METHOD TO IMPROVE BLOWTHROUGH AND EGR VIA SPLIT EXHAUST

CROSS REFERENCE TO RELATED APPLICATIONS

The present application is a continuation-in-part of U.S. patent application Ser. No. 14/157,167, entitled "METHOD TO IMPROVE BLOWTHROUGH VIA SPLIT EXHAUST," filed on Jan. 16, 2014, the entire contents of which are hereby incorporated by reference for all purposes.

TECHNICAL FIELD

The present application relates to a split exhaust in an exhaust system of a boosted internal combustion engine.

BACKGROUND AND SUMMARY

Engines may use boosting devices, such as turbochargers, to increase engine power density. However, engine knock may occur due to increased combustion temperatures. The engine knock may be addressed by retarding spark timing; however, significant spark retard can reduce fuel economy and limit maximum torque. Knock is especially problematic under boosted conditions due to high charge temperatures.

One method to reduce charge temperature and therefore knock, is via blowthrough wherein boosted intake air is blown through the combustion chamber to the exhaust during a positive valve overlap phase.

Another method to suppress knock is by diluting intake air with cooled exhaust gas recirculation (EGR). An example approach of controlling the flow of exhaust gases for EGR is shown by Roth (U.S. Pat. No. 8,495,992) wherein a split exhaust system separates exhaust gases exiting the combustion chamber during blowdown and scavenging phases. Exhaust gases from the blowdown phase are distributed either to the turbine in a turbocharger system or to an EGR system which directs cooled EGR gases to the intake manifold or upstream of the compressor in a turbocharger. Likewise, exhaust gases from the scavenging phase are conveyed to either an emission control device or to an EGR system which delivers cooled gases to the intake manifold or upstream of the compressor. Intake and exhaust valve timings are controlled to regulate the amount of exhaust gases flowing to the turbocharger and/or EGR based on engine operating conditions.

The inventors herein have identified potential issues, including issues with the above approaches to addressing knock limits. For example, an EGR throttle may be placed in the intake, upstream of the compressor, to enhance EGR flow at low backpressure which can make the turbocharger more sensitive to surge and increase pumping losses. Further, in the example where a blowthrough technique is used to reduce knock, additional fuel injected to bring exhaust gases to a stoichiometric ratio can cause over-temperature of the catalyst and affect emissions while increasing fuel consumption. Further still, engine efficiency may be degraded at lower engine loads and EGR may contribute to combustion instabilities.

The inventors herein have recognized the above issues and identified approaches to at least partly address the issues. In one example approach, a method for an engine comprises directing exhaust from a first cylinder group to one or more of a pre-compressor location, a post-compressor location, and an exhaust turbine, and directing exhaust from a second cylinder group to one or more of the pre-compressor location, and the exhaust turbine. In this way, exhaust gases can be recirculated by separate cylinder groups to distinct locations for improving performance and efficiency.

For example, a boosted engine may include a first cylinder group and a second cylinder group wherein the first cylinder group comprises cylinders distinct from the second cylinder group. Exhaust from the first cylinder group may be directed to one or more of three separate destinations including a first location upstream of a compressor (pre-compressor), a second location downstream of the compressor (post-compressor), and a third location directly upstream of an exhaust turbine. The second location downstream of the compressor may include a location downstream of an intake throttle and upstream of an intake manifold. Exhaust from the second cylinder group may be directed to one or more of the first location upstream of the compressor and the third location directly upstream of the exhaust turbine. As such, exhaust may be directed to one or more of the above described locations based on engine conditions. Exhaust from the first cylinder group may be directed to the second location during medium engine loads as well as lower engine loads while exhaust from the second cylinder group is concurrently directed to the exhaust turbine. During higher engine loads, a larger proportion of exhaust gases may be directed to the exhaust turbine from both the first cylinder group and the second cylinder group while directing a smaller proportion of exhaust gases to the location upstream of the compressor. Herein, the smaller proportion of exhaust gases may be blown through cylinders to upstream of the compressor along with fresh intake air by adjusting a valve timing to allow positive valve overlap between at least one intake valve and one exhaust valve of each cylinder of the first cylinder group and the second cylinder group.

In this way, knock can be reduced during different engine conditions while enhancing engine efficiency. Recirculation of exhaust gases from the first cylinder group to the location downstream of the compressor during specific engine conditions e.g. lower and medium engine loads, may enable a reduction in pumping losses as well as heat loss. At the same time, by directing exhaust from the second cylinder group to the exhaust turbine, desired engine power may be provided. As such, the reduced pumping losses and heat loss may improve engine efficiency. Further still, during higher engine loads, allowing fresh intake air to blow through any residual hot exhaust gases in the cylinders can lower temperatures within the combustion chambers. Moreover, since the blowthrough air is not directed to an emission control device, maintaining stoichiometric ratio in the exhaust with an injection of extra fuel may not be required.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 depicts example valve operations and ensuing exhaust flow via the three passages of one cylinder of the engine in FIG. 1 based on various engine conditions.

FIG. 12 shows a table listing the various modes of operation of the plurality of cylinders of the second embodiment of the turbocharged engine.

DETAILED DESCRIPTION

Figure 1:
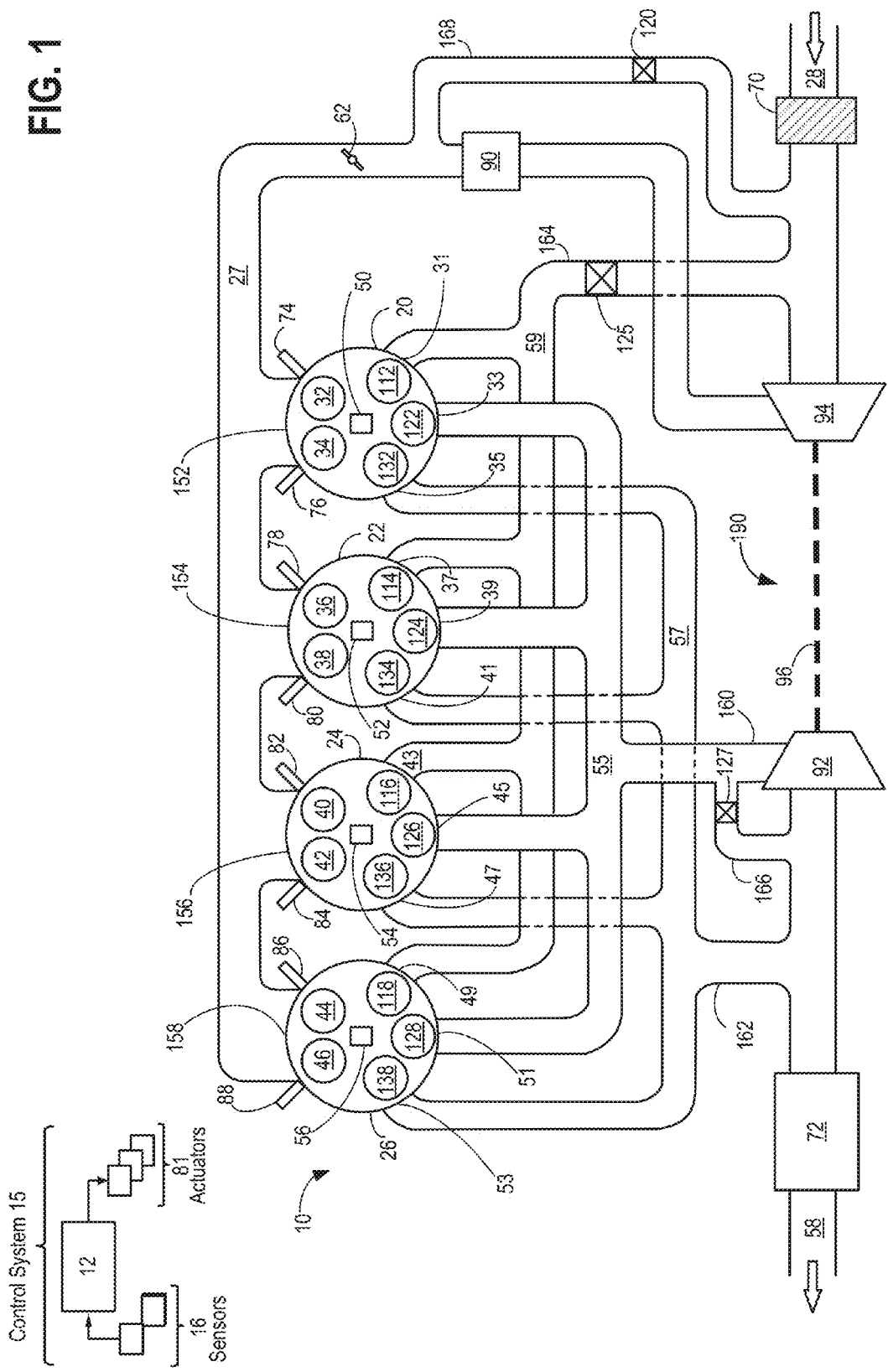
FIG. 1 portrays a schematic depiction of a turbocharged engine system with a split exhaust manifold.
Figure 2:
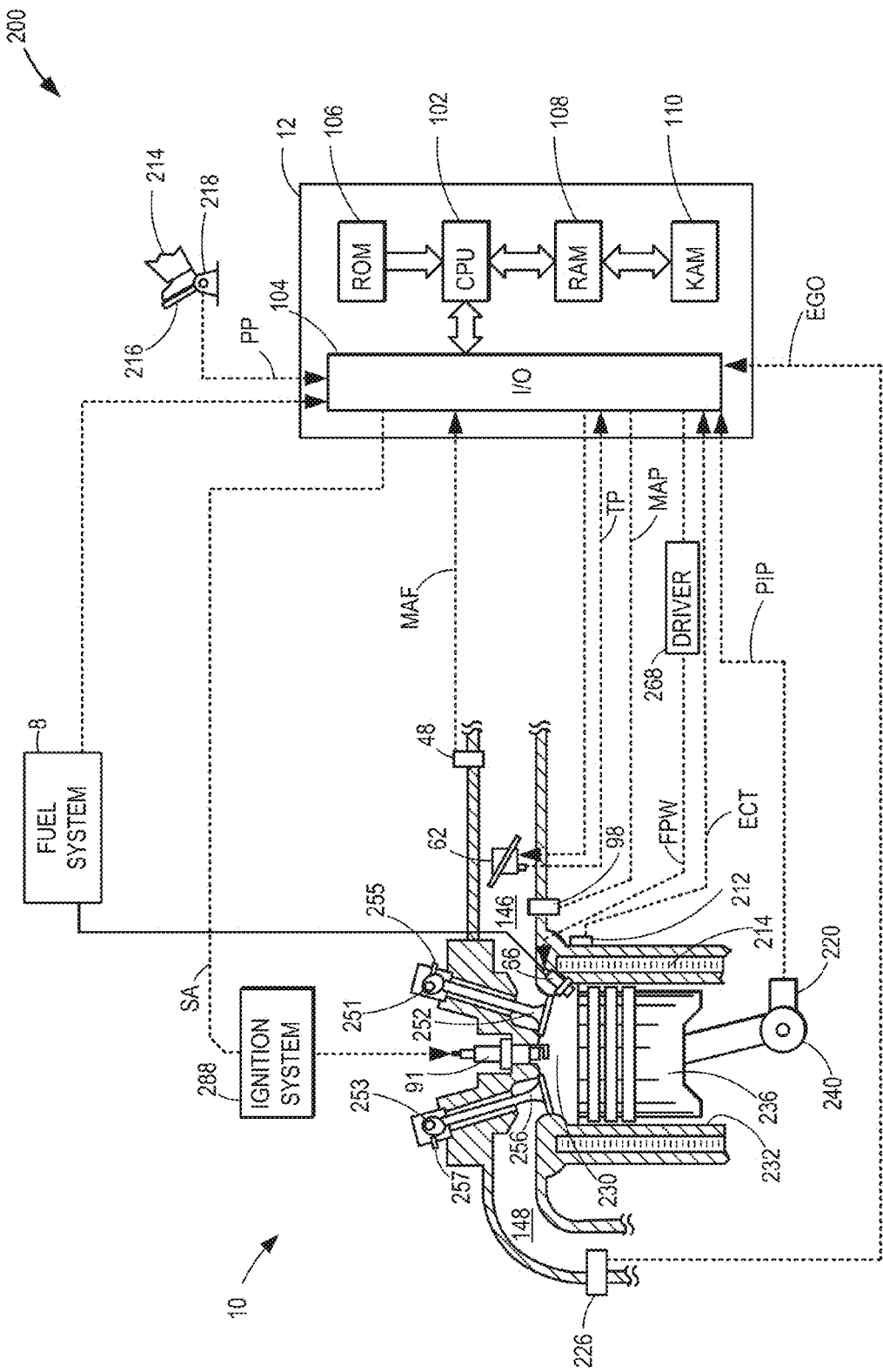
FIG. 2 shows a partial engine view.
Figure 3:
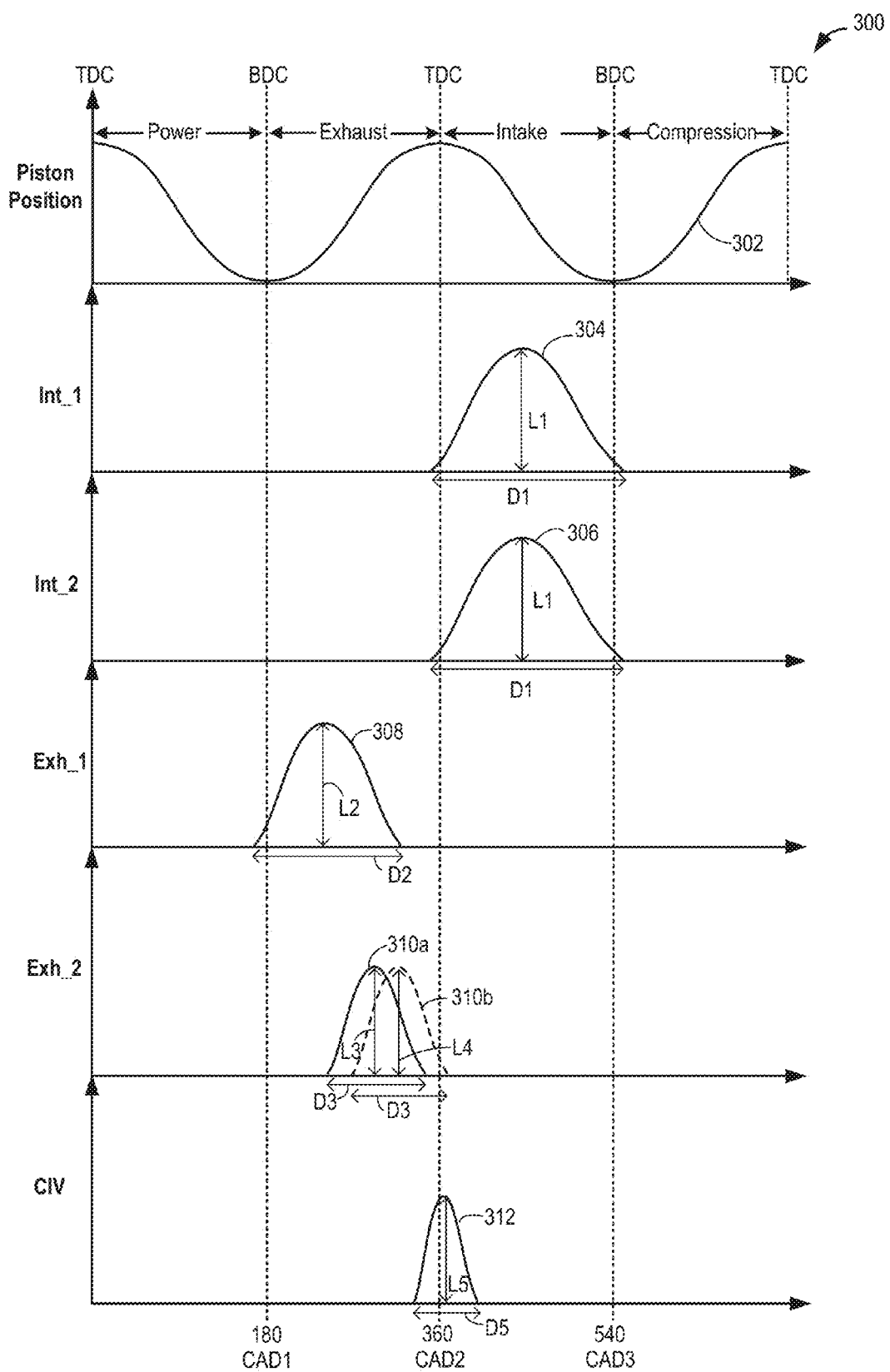
FIG. 3 depicts example cylinder intake valve and exhaust valve timings for one of the engine cylinders of FIG. 1.
Figure 7:
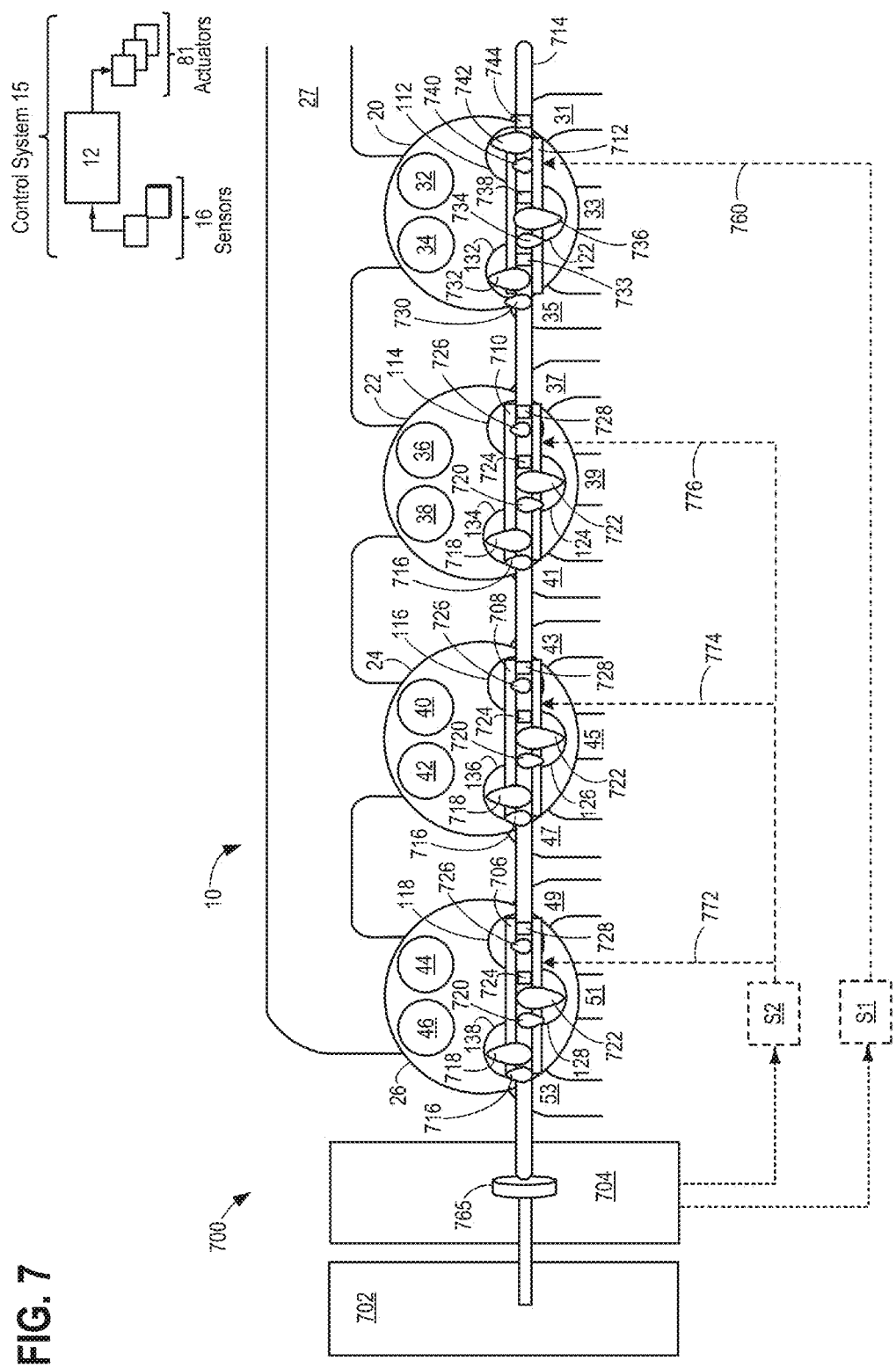
FIG. 7 presents a schematic depiction of the second embodiment of the turbocharged engine including a cam profile switching system.
Figure 8:
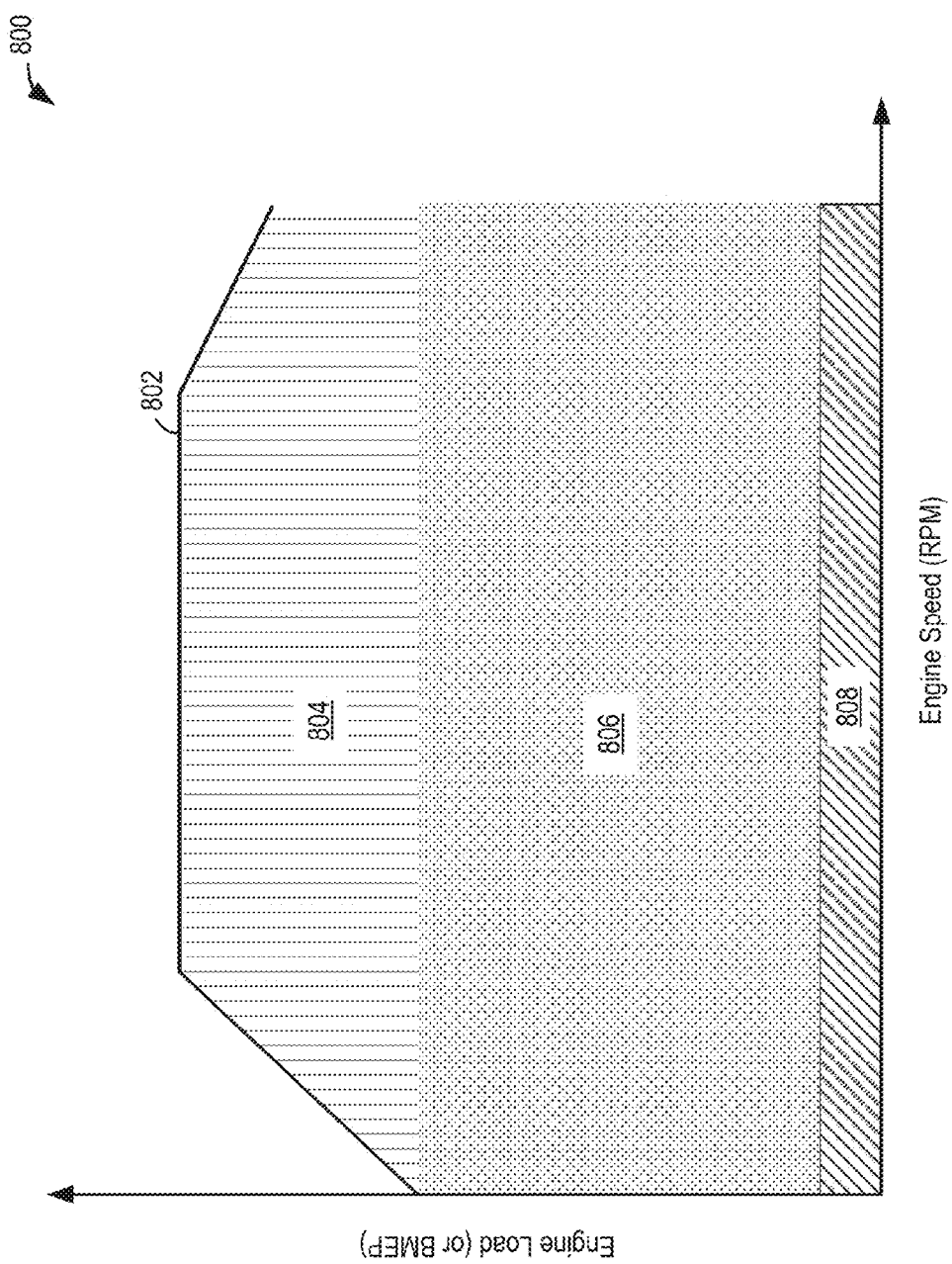
FIG. 8 shows an example map of engine operating conditions that may be used to determine operating modes of the second embodiment of the turbocharged engine.

The following description relates to systems and methods for controlling knock in an engine, such as the engine system of FIGS. 1-2, by exhausting an engine cylinder through three distinct passages. Specifically, within one combustion cycle, a first or blowdown portion of an exhaust may be guided to a turbine of a turbocharger through a first passage, a second or scavenged portion of an exhaust may be directed to an emission control device via a second passage while a third portion of exhaust gases towards the end of an exhaust stroke mixed with blowthrough air may be directed to an inlet of a compressor in a turbocharger through a third passage. Each cylinder of the engine, thus, may comprise five valves: two intake valves, two exhaust valves and one compressor inlet valve. An engine controller may be configured to perform a control routine, such as the routine of FIG. 4, to operate the compressor inlet valve based on a variety of engine operating conditions such as those shown in FIG. 5. The compressor inlet valve timings may be coordinated with timings of the exhaust valves as well as the intake valves to allow for exhaust gas recirculation (EGR) and blowthrough (FIG. 3). In a second embodiment shown in FIG. 6, engine efficiency may be enhanced during low to medium engine loads. Herein, a cam profile switching system may be coupled to each of the two exhaust valves and the compressor inlet valve (FIG. 7) of each engine cylinder. Further, a fourth passage may be included within the second embodiment fluidically coupling each of the compressor inlet valves of each engine cylinder with an intake manifold of the engine downstream of the compressor. By adjusting valve timings (FIGS. 9A, 9B, and 9C) of the exhaust valves and the compression inlet valves of each engine cylinder, the engine may be operated in three different modes (FIG. 10). A distinct mode of operation may be selected based on existing engine operating conditions (FIG. 11) including existing engine loads and engine speeds (FIG. 8). As such, exhaust gases from different durations of an exhaust stroke within each engine cylinder during a single engine cycle may be directed to distinct locations in the engine system (FIG. 12) providing knock control via EGR and cooling of the cylinders via blowthrough. Further, by varying the locations where the exhaust gases are recirculated, engine efficiency may be improved.

In the following description, a valve being operational or activated indicates that it is opened and/or closed according to determined timings during the combustion cycle for a given set of conditions. Likewise, a valve being deactivated or inoperative indicates that the valve is maintained closed, unless otherwise stated. The deactivated valve, when maintained closed, may block fluid flow (including gases) therethrough.

FIG. 1 shows a schematic diagram of a multi-cylinder internal combustion engine 10, which may be included in a propulsion system of an automobile. Engine 10 may include a plurality of combustion chambers (also termed, cylinders) which may be capped on the top by a cylinder head (not shown). In the example shown in FIG. 1, engine 10 includes combustion chambers 20, 22, 24, and 26, arranged in an inline-4 configuration. It should be understood, however, that though FIG. 1 shows four cylinders, engine 10 may include any number of cylinders in any configuration, e.g., V-6, I-6, V-12, opposed 4, etc.

Each combustion chamber may receive intake air from an intake manifold 27 via an air intake passage 28. Intake manifold 27 may be coupled to the combustion chambers via intake ports. For example, intake manifold 27 is shown in FIG. 1 coupled to cylinders 20, 22, 24, and 26 via intake ports 152, 154, 156, and 158 respectively. Each intake port may supply air and/or fuel to the cylinder it is coupled to for combustion. Each cylinder intake port can selectively communicate with the cylinder via one or more intake valves. Cylinders 20, 22, 24, and 26 are shown in FIG. 1 with two intake valves each. For example cylinder 20 has two intake valves 32 and 34, cylinder 22 has two intake valves 36 and 38, cylinder 24 has two intake valves 40 and 42, and cylinder 26 has two intake valves 44 and 46. In one example, an intake passage may be formed from intake manifold 27 selectively communicating with each intake valve. In other embodiments, an intake passage for a single cylinder may be split close to the cylinder into two adjacent paths with a wall in-between, each split path of the passage communicating with a single intake valve. In another example, each of the two intake valves may be controlled to open at specific engine speeds and therefore, may communicate through a common intake port with the intake manifold.

Each combustion chamber may exhaust combustion gases via one or more exhaust ports coupled thereto. Cylinders 20, 22, 24 and 26 are shown in FIG. 1 each coupled to two exhaust ports respectively for channeling the blowdown and scavenging portions of the combustion gases separately. For example, exhaust ports 33 and 35 are coupled to cylinder 22, exhaust ports 39 and 41 are coupled to cylinder 22, exhaust ports 45 and 47 are coupled to cylinder 24 and exhaust ports 51 and 53 are coupled to cylinder 26. Each exhaust port can selectively communicate with the cylinder it is coupled to via an exhaust valve. For example, exhaust ports 33, 35, 39, 41, 45, 47, 51, and 53 communicate with their respective cylinders via their respective exhaust valves 122, 132, 124, 134, 126, 136, 128, and 138.

This being a split manifold system, exhaust ports 33, 39, 45, and 51 may lead into an exhaust manifold 55 while exhaust ports 35, 41, 47, and 53 may combine into an exhaust manifold 57. The exhaust manifolds in this system may be configured to exhaust the combustion products from cylinders 20, 22, 24 and 26.

Engine 10 may include a turbocharger 190. Turbocharger 190 may include an exhaust turbine 92 and an intake compressor 94 coupled on a common shaft 96. A wastegate 127 may be coupled across turbine 92. Specifically, wastegate 127 may be included in a bypass 166 coupled between an inlet and outlet of the exhaust turbine to control an amount of boost provided by the turbine.

The exhaust manifolds may be designed to separately channel the blowdown and scavenging portions of the exhaust. Exhaust manifold 55 may channel the blowdown pulse of the exhaust to turbine 92 of turbocharger 190 via pipe 160 while exhaust manifold 57 may channel the scavenging portion of exhaust via pipe 162 to downstream of turbine 92 and upstream of an emission control device 72 (also termed, exhaust emission device, exhaust catalyst, emissions catalyst, etc.). For example, exhaust valves 122, 124, 126, and 128 channel the blowdown portion of the exhaust gases through exhaust manifold 55 and pipe 160 to the turbine while exhaust valves 132, 134, 136, and 138 channel the scavenging portion of exhaust gases through exhaust manifold 57 via pipe 162 to an emission control device 72.

Exhaust gases exiting turbine 92 may pass through emission control device 72 as well. Emission control device 72 can include multiple catalyst bricks, in one example. In another example, multiple emission control devices, each with multiple bricks, can be used. In some examples, emission control device 72 may be a three-way type catalyst. In other examples, emission control device 72 may include one or a plurality of a diesel oxidation catalyst (DOC), and a selective catalytic reduction catalyst (SCR). After passing through emission control device 72, exhaust gas may be directed out to a tailpipe 58.

Each cylinder of engine 10 may also comprise a fifth valve, termed "compressor inlet valve," in addition to two intake and two exhaust valves as shown in FIG. 1. This fifth valve can also be termed a third exhaust valve. For example cylinders 20, 22, 24, and 26 include compressor inlet valves 112, 114, 116, and 118 respectively which are coupled to their respective ports 31, 37, 43 and 49. Further, each of the ports communicating with the compressor inlet valves may combine into a distinct manifold 59 which may be connected via pipe 164 to intake 28 upstream of compressor 94 and downstream of air filter 70. For example, compressor inlet valve 112 may be opened in cylinder 20 towards the end of an exhaust stroke to allow residual exhaust gases to flow through to the inlet of compressor 94. Further, compressor inlet valve 112 may remain open past top dead center (TDC) position of the piston to overlap with intake valves 32 and/or 34 of cylinder 20 to allow fresh intake air to blowthrough the combustion chamber and flush out any remaining exhaust to compressor 94. Valve 125 may be included in pipe 164 to control the flow of EGR and blowthrough air into the compressor inlet. Valve 125 may be termed a first exhaust recirculation valve (ERV) 125. Further, valve 125 may also be termed a pre-compressor ERV as valve 125 may regulate the flow of exhaust gases and blowthrough air to a location upstream of the compressor. As such, valve 125 may be a binary valve (e.g., a two-way valve) that may be controlled to either fully open or fully closed (shut). A fully open position of a binary valve is a position in which the valve exerts no flow restriction, and a fully closed position of the binary valve is a position in which the valve restricts all flow such that no flow may pass through the valve. In alternative embodiments, valve 125 may be a continuously variable valve capable of assuming positions between fully-closed and fully-open.

In one example, a quantity of blowthrough air and EGR being supplied to the compressor inlet may be controlled by changing timing, lift and/or duration of one or more compressor inlet valves 112, 114, 116 and 118. In another example, valve 125 in pipe 164 may be operated to control the quantity of blowthrough air and EGR being delivered to compressor 94 and the compressor inlet valve(s) may be operated with fixed timings, lift and durations.

Thus, combusted gases exiting a cylinder may be separated into three parts via three distinct passages which include two exhaust passages formed by the split exhaust manifold and one passage connecting the compressor inlet valve to upstream of the turbo-compressor. For example, in one combustion cycle, a first exhaust valve 122 of cylinder 20 may channel a first portion of the exhaust, namely the blowdown portion, to turbine 92 via a first passage (pipe 160). A second exhaust valve 132 of the same cylinder (20) may direct a second portion of exhaust gases following the blowdown portion to an emission control device 72 via a second passage (pipe 162). The second portion of exhaust gases exiting via the second exhaust valve 132 may primarily be the scavenging portion of exhaust gases. Towards the end of the exhaust stroke, leftover exhaust gases may be cleaned out from the clearance volume of the same cylinder (20) by fresh intake air from blowthrough and transferred to the inlet of turbo-compressor 94 via the compressor inlet valve 112 and a third passage (pipe 164). Specifically, the second portion of exhaust gases is comprised mostly of exhaust gases without any content of fresh air while compressor inlet valve 112 and pipe 164 mostly convey fresh blowthrough air with a smaller content of exhaust gases.

The first exhaust valve may open earlier than the second exhaust valve and compressor inlet valve to capture the blowdown pulse and may be closed at a timing earlier than the second exhaust and compressor inlet valves. The second exhaust valve may open later than the first exhaust valve but earlier than the compressor inlet valve to capture the scavenging portion of exhaust gases. The first exhaust valve may be closed before the compressor inlet valve opens but the second exhaust valve may close after the compressor inlet valve is opened. The second exhaust valve may be closed much before the intake stroke begins and the intake valves are opened whereas the compressor inlet valve may be closed well after the onset of the intake stroke. The intake valves may be opened just before the exhaust stroke ends at TDC position of the piston and may be closed just past the onset of the compression stroke, for e.g., at bottom dead center (BDC) position of the piston. Effectively, the compressor inlet valve may channel residual exhaust gases towards the end of the exhaust stroke and by overlapping with one or more intake valves may also channel blowthrough along with the EGR.

Intake passage 28 may include an intake throttle 62 (also termed, throttle 62) downstream of a charge air cooler 90. The position of throttle 62 can be adjusted by control system 15 via a throttle actuator (not shown) communicatively coupled to controller 12. By modulating intake throttle 62, while operating compressor 94, an amount of fresh air may be inducted from the atmosphere into engine 10, cooled by charge air cooler 90 and delivered to the engine cylinders at compressor (or boosted) pressure via intake manifold 27. To reduce compressor surge, at least a portion of the aircharge compressed by compressor 94 may be recirculated to the compressor inlet. A compressor recirculation passage 168 may be provided for recirculating cooled compressed air from the compressor outlet, downstream of charge-air cooler 90 to the compressor inlet. Compressor recirculation valve 120 may be provided for adjusting an amount of cooled recirculation flow recirculated to the compressor inlet.

In FIG. 1, fuel injectors are shown coupled directly to the combustion chambers for injecting fuel directly therein in proportion to a pulse width of a signal FPW received from controller 12 via an electronic driver, for example. Each cylinder is shown coupled with two injectors per cylinder at each intake valve. For example, fuel injectors 74 and 76 are coupled to cylinder 20, 78 and 80 are coupled to cylinder 22, 82 and 84 are coupled to cylinder 24 while fuel injectors 86 and 88 are coupled to cylinder 26 as shown in FIG. 1. In this manner, the fuel injectors provide what is known as direct injection of fuel into the combustion chamber. Each respective fuel injector may be mounted in the side of the respective combustion chamber or in the top of the respective combustion chamber, for example. In some examples, one or more fuel injectors may be arranged in intake manifold 27 in a configuration that provides what is known as port injection of fuel into the intake ports upstream of the respective combustion chambers. Though not shown in FIG. 1, fuel may be delivered to the fuel injectors by a fuel system including a fuel tank, a fuel pump, a fuel line, and a fuel rail.

In some examples, a distributorless ignition system (not shown) may provide an ignition spark to spark plugs coupled to the combustion chambers in response to controller 12. For example, spark plugs 50, 52, 54, and 56 are shown in FIG. 1 coupled to cylinders 20, 22, 24, and 26, respectively.

Engine 10 may be controlled at least partially by a control system 15 including controller 12 and by input from a vehicle operator via an input device (not shown). Control system 15 is shown receiving information from a plurality of sensors 16 (various examples of which are described herein) and sending control signals to a plurality of actuators 81. As one example, sensors 16 may include turbo-compressor inlet pressure and temperature sensors, and manifold air pressure (MAP) sensors located within the intake passage. Other sensors may include a throttle inlet pressure (TIP) sensor for estimating a throttle inlet pressure (TIP) and/or a throttle inlet temperature sensor for estimating a throttle air temperature (TCT) coupled downstream of the throttle in the intake passage. Additional system sensors and actuators are elaborated below with reference to FIG. 2. As another example, actuators 81 may include fuel injectors, valves 120, 125, and 127, and throttle 62. Controller 12 may receive input data from the various sensors, process the input data, and trigger the actuators in response to the processed input data based on instruction or code programmed therein corresponding to one or more routines. An example control routine is described herein at FIG. 4.

Referring to FIG. 2, it depicts a partial view 200 of a single cylinder of internal combustion engine 10. As such, components previously introduced in FIG. 1 are represented with the same reference numbers and are not re-introduced.

Engine 10 is depicted with combustion chamber (cylinder) 230, coolant sleeve 214, and cylinder walls 232 with piston 236 positioned therein and connected to crankshaft 240. Combustion chamber 230 is shown communicating with intake passage 146 and exhaust passage 148 via respective intake valve 252 and exhaust valve 256. As previously described in FIG. 1, each cylinder of engine 10 may exhaust combustion products along three conduits. In the depicted view 200, exhaust passage 148 represents the first exhaust port leading from the cylinder to the turbine (such as exhaust port 33 of FIG. 1) while the second exhaust conduit and the conduit leading to the compressor inlet are not visible in this view.

As also previously elaborated in FIG. 1, each cylinder of engine 10 may include two (or more) intake valves and two (or more) exhaust valves in addition to a compressor inlet valve. In the depicted view 200, intake valve 252 and exhaust valve 256 are located at an upper region of combustion chamber 230. Intake valve 252 and exhaust valve 256 may be controlled by controller 12 using respective cam actuation systems including one or more cams. The cam actuation systems may utilize one or more of cam profile switching (CPS), variable cam timing (VCT), variable valve timing (VVT) and/or variable valve lift (VVL) systems to vary valve operation. In the depicted example, each intake valve 252 is controlled by an intake cam 251 and each exhaust valve 256 is controlled by an exhaust cam 253. The position of intake valve 252 and exhaust valve 256 may be determined by valve position sensors 255 and 257, respectively.

In alternate embodiments, the intake and/or exhaust valve may be controlled by electric valve actuation. For example, cylinder 230 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system. Note that the compressor inlet valve may be similarly controlled.

In one example, intake cam 251 includes separate and different cam lobes that provide different valve profiles (e.g., valve timing, valve lift, duration, etc.) for each of the two intake valves of combustion chamber 230. Likewise, exhaust cam 253 may include separate and different cam lobes that provide different valve profiles (e.g., valve timing, valve lift, duration, etc.) for each of the two exhaust valves of combustion chamber 230. Similarly, the compressor inlet valve (not shown in FIG. 2) may be controlled by a camshaft that includes separate and different cam lobes that provide a variety of valve profiles. In another example, intake cam 251 may include a common lobe, or similar lobes, that provide a substantially similar valve profile for each of the two intake valves.

In addition, different cam profiles for the different exhaust valves can be used to separate exhaust gases exhausted at low cylinder pressure from exhaust gases exhausted at exhaust pressure. For example, a first exhaust cam profile can open from closed position the first exhaust valve just before BDC (bottom dead center) of the power stroke of combustion chamber 230 and close the same exhaust valve well before top dead center (TDC) to selectively exhaust blowdown gases from the combustion chamber. Further, a second exhaust cam profile can be positioned to open from close a second exhaust valve at about the mid-point of the exhaust stroke and close it before TDC to selectively exhaust the scavenging portion of the exhaust gases. Further still, a compressor inlet cam profile can be set to open from closed position the compressor inlet valve towards the end of the exhaust stroke. The compressor inlet valve may be closed well after TDC past the onset of the intake stroke enabling an overlap between the compressor inlet valve and one or more of the intake valves which may be opened during the intake stroke.

The compressor inlet valve may be activated or deactivated based on the intake manifold air pressure. Specifically, when intake manifold air pressure is higher than compressor inlet pressure, exhaust gases within the cylinder may be drawn along with blowthrough to the low pressure compressor inlet reducing pumping losses. Conversely, when the manifold air pressure is lower than the compressor inlet pressure, for e.g., under throttled conditions, compressor inlet valve operation may be deactivated during an entire engine cycle to prevent reverse flow of air from the compressor inlet into the intake manifold via the cylinder and the compressor inlet valve. In this example, the exhaust gases may be diverted entirely to the turbine and the emission control device by the two exhaust valves without any blowthrough.

Thus, the timing of the first exhaust valve and the second exhaust valve can isolate cylinder blowdown gases from scavenging portion of exhaust gases while any residual exhaust gases in the clearance volume of the cylinder can be cleaned out with fresh intake air blowthrough during positive valve overlap between the intake valve and compressor inlet valve. By flowing a first portion of the exhaust gas (e.g., higher pressure exhaust) through the turbine and a higher pressure exhaust passage and flowing a second portion of the exhaust gas (e.g., lower pressure exhaust) through catalytic devices and a lower pressure exhaust passage, while a third portion of low pressure exhaust and blowthrough air is circulated to the compressor inlet, combustion temperatures can be reduced while improving the turbine's work efficiency and engine torque.

Continuing with FIG. 2, exhaust gas sensor 226 is shown coupled to exhaust passage 148. Sensor 226 may be positioned in the exhaust passage upstream of one or more emission control devices, such as device 72 of FIG. 1. Sensor 226 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. The downstream emission control devices may include one or more of a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Cylinder 230 can have a compression ratio, which is the ratio of volumes when piston 236 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 91 for initiating combustion. Ignition system 288 can provide an ignition spark to combustion chamber 230 via spark plug 91 in response to spark advance signal SA from controller 12, under select operating modes. However, in some embodiments, spark plug 91 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 230 is shown including one fuel injector 66. Fuel injector 66 is shown coupled directly to combustion chamber 230 for injecting fuel directly therein in proportion to the pulse width of signal FPW received from controller 12 via electronic driver 268. In this manner, fuel injector 66 provides what is known as direct injection (hereafter also referred to as "DI") of fuel into combustion cylinder 230. While FIG. 2 shows injector 66 as a side injector, it may also be located overhead of the piston, such as near the position of spark plug 91. Such a position may improve mixing and combustion when operating the engine with an alcohol-based fuel due to the lower volatility of some alcohol-based fuels. Alternatively, the injector may be located overhead and near the intake valve to improve mixing. In an alternate embodiment, injector 66 may be a port injector providing fuel into the intake port upstream of cylinder 230.

Fuel may be delivered to fuel injector 66 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 8 may hold fuel with different fuel qualities, such as different fuel compositions. These differences may include different alcohol content, different octane, different heat of vaporizations, different fuel blends, and/or combinations thereof etc. In some embodiments, fuel system 8 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Controller 12 is shown in FIG. 2 as a microcomputer, including a microprocessor unit 102, input/output ports 104, an electronic storage medium for executable programs and calibration values shown as a read-only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 48; engine coolant temperature (ECT) from temperature sensor 212 coupled to coolant sleeve 214; a profile ignition pickup signal (PIP) from Hall effect sensor 220 (or other type) coupled to crankshaft 240; throttle position (TP) from a throttle position sensor; absolute manifold pressure signal (MAP) from sensor 98, cylinder AFR from EGO sensor 226, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 66, throttle 62, spark plug 91, compressor inlet valve, intake/exhaust valves and cams, etc. The controller may receive input data from the various sensors, process the input data, and trigger the actuators in response to the processed input data based on instruction or code programmed therein corresponding to one or more routines. An example control routine will be described later with regard to FIG. 4.

Now turning to FIG. 3, map 300 depicts example valve timings with respect to a piston position, for an engine cylinder comprising 5 valves: two intake valves, two exhaust valves and one compressor inlet valve, such as described in FIGS. 1-2. The example of FIG. 3 is drawn substantially to scale, even though each and every point is not labeled with numerical values. As such, relative differences in timings can be estimated by the drawing dimensions. However, other relative timings may be used, if desired.

Continuing with FIG. 3, the cylinder is configured to receive intake via two intake valves and exhaust a first blowdown portion to a turbine inlet via a first exhaust valve, exhaust a second scavenging portion to an emission control device via a second exhaust valve and flow a combination of low pressure exhaust and fresh blowthrough air to the inlet of a turbo-compressor via a compressor inlet valve. By adjusting the timing of the opening and/or closing of the compressor inlet valve with that of the two exhaust and two intake valves, residual exhaust gases in the cylinder clearance volume may be cleaned out and recirculated as EGR along with fresh intake blowthrough air.

Map 300 illustrates an engine position along the x-axis in crank angle degrees (CAD). Curve 302 depicts piston positions (along the y-axis), with reference to their location from top dead center (TDC) and/or bottom dead center (BDC), and further with reference to their location within the four strokes (intake, compression, power and exhaust) of an engine cycle.

During engine operation, each cylinder typically undergoes a four stroke cycle including an intake stroke, compression stroke, expansion stroke, and exhaust stroke. During the intake stroke, generally, the exhaust valves close and intake valves open. Air is introduced into the cylinder via the corresponding intake passage, and the cylinder piston moves to the bottom of the cylinder so as to increase the volume within the cylinder. The position at which the piston is near the bottom of the cylinder and at the end of its stroke (e.g., when the combustion chamber is at its largest volume) is typically referred to by those of skill in the art as bottom dead center (BDC). During the compression stroke, the intake valves and exhaust valves are closed. The piston moves toward the cylinder head so as to compress the air within combustion chamber. The point at which the piston is at the end of its stroke and closest to the cylinder head (e.g., when the combustion chamber is at its smallest volume) is typically referred to by those of skill in the art as top dead center (TDC). In a process herein referred to as injection, fuel is introduced into the combustion chamber. In a process herein referred to as ignition, the injected fuel is ignited by known ignition means, such as a spark plug, resulting in combustion. During the expansion stroke, the expanding gases push the piston back to BDC. A crankshaft converts this piston movement into a rotational torque of the rotary shaft. During the exhaust stroke, in a traditional design, exhaust valves are opened to release the residual combusted air-fuel mixture to the corresponding exhaust passages and the piston returns to TDC. In this description, the compressor inlet valve may be opened towards the end of the exhaust stroke while the exhaust valves are closed to flush out residual exhaust gases with blowthrough air.

Curve 304 depicts a first intake valve timing, lift, and duration for a first intake valve (Int_1) while curve 306 depicts a second intake valve timing, lift, and duration for a second intake valve (Int_2) coupled to the intake passage of the engine cylinder. Curve 308 depicts an example exhaust valve timing, lift, and duration for a first exhaust valve (Exh_1) coupled to a first exhaust passage of the engine cylinder, while curves 310a and 310b depict example exhaust valve timings, lifts, and durations for a second exhaust valve (Exh_2) coupled to a second exhaust passage of the engine cylinder. As previously elaborated, the first exhaust passage connects a first exhaust valve to the inlet of a turbine in a turbocharger and the second exhaust passage connects a second exhaust valve to downstream of the turbine and upstream of an emission control device. Curve 312 depicts an example valve timing, lift and duration for a compressor inlet valve (CIV) coupled to a third passage that connects the CIV to the inlet of the turbo-compressor. The first and second exhaust passages and the third passage for flowing EGR and blowthrough air may be separate from each other.

In the depicted example, the first and second intake valves are fully opened from a closed position at a common timing (curves 304 and 306), starting substantially closer to intake stroke TDC, just before CAD2 (e.g., at or just before intake stroke TDC) and are closed just after a subsequent compression stroke has commenced past CAD3 (e.g., at or just after BDC). Additionally, when opened fully the two intake valves may be opened with the same amount of valve lift L1 for the same duration of D1. In other examples, the two valves may be operated with a different timing by adjusting the phasing, lift or duration based on engine conditions.

Now turning to the exhaust valves wherein the timing of the first and the second exhaust valves is staggered with that of the compressor inlet valve (CIV). Specifically, the first exhaust valve is opened from a closed position at a first timing (curve 308) that is earlier in the engine cycle than the timing (curves 310a, 310b) at which the second exhaust valve is opened from close and that is earlier than the timing (curve 312) at which the CIV is opened from close. Specifically, the first timing for the first exhaust valve is closer to exhaust stroke BDC, just before CAD1 (e.g., at or just before exhaust stroke BDC) while the timing for opening the second exhaust valve and the CIV is retarded from exhaust stroke BDC, after CAD1 but before CAD2. The first (curve 308) and second (curve 310a) exhaust valves may be closed before the end of the exhaust stroke while the CIV is maintained open past TDC when the intake stroke has commenced to overlap positively with the intake valves. The CIV may be closed, for example, before the midpoint of the intake stroke.

To elaborate, the first exhaust valve may be fully opened from close at or before the start of an exhaust stroke (for e.g., within 10 degrees before BDC), maintained fully open through a first part of the exhaust stroke and may be fully closed before the exhaust stroke ends (for e.g., within 45 degrees before TDC) to collect the blowdown portion of the exhaust pulse. The second exhaust valve (curve 310a) may be fully opened from a closed position at about the midpoint of the exhaust stroke (for e.g., between 60 and 90 degrees past BDC), maintained open through a second portion of the exhaust stroke and may be fully closed before the exhaust stroke ends (for e.g., within 20 degrees before TDC) to exhaust the scavenging portion of the exhaust. The CIV may be fully opened from close towards the end of the exhaust stroke (for e.g., within 25 degrees before TDC), may be maintained fully open at least until a subsequent intake stroke has commenced and may be fully closed well after exhaust stroke TDC (for e.g., within 30 degrees past TDC).

The intake valves may be fully opened from close just before the exhaust stroke ends (for e.g., within 10 degrees before TDC), maintained open through the intake stroke and may be fully closed at or just past the onset of the compression stroke (for e.g., within 10 degrees past BDC). Therefore, the CIV and the intake valves, as shown in FIG. 3, may have a positive overlap phase (for e.g., from within 10 degrees before TDC until 30 degrees past TDC) to allow blow-through with EGR. This cycle, wherein all five valves are operational, may repeat itself based on engine operating conditions.

Further, the first exhaust valve may be fully closed and maintained closed well before the CIV is fully opened while the second exhaust valve may be fully closed just after the CIV is opened. Further, the first and second exhaust valves may overlap with each other, the second exhaust valve and the CIV may overlap minimally with each other but, the first exhaust valve may not overlap with the CIV.

As mentioned earlier, the CIV may be operational when the MAP is higher than the compressor inlet pressure. However, when the MAP is lower than the compressor inlet pressure, the CIV may be deactivated and maintained closed until the MAP is higher than the pressure at the compressor inlet. Specifically, the CIV may be closed, if open, or maintained closed to prevent reverse air flow from the engine intake via the cylinder into the intake manifold. Herein, the timing of the first exhaust valve may be the same as the first timing as depicted in curve 308 of FIG. 3: opening just before BDC when the exhaust stroke commences and closing well before the end of the exhaust stroke TDC. However, the second exhaust valve may be opened about halfway through the exhaust stroke, and may be maintained open (curve 310*b*) until just after the end of the exhaust stroke (for e.g., 10 degrees past TDC) to drain the cylinder of its exhaust. The second exhaust valve may be fully closed at or just after the exhaust stroke ends and positive valve overlap may not occur between the second exhaust valve and the intake valves to avoid blowthrough.

Essentially, the timings of the second exhaust valve may be varied based on activation or deactivation of the CIV. When MAP is higher than compressor inlet pressure and the CIV is operational through the combustion cycle, the second exhaust valve may be opened about halfway through the exhaust stroke and closed well before the end of the exhaust stroke (curve 310*a*). In one example, the second exhaust valve may be opened about 80 degrees past BDC and closed within 20 degrees before TDC. When MAP is lower than compressor inlet pressure and the CIV is deactivated and maintained closed, the second exhaust valve may be opened about halfway through the exhaust stroke and fully closed as the exhaust stroke ends at or just past TDC (curve 310*b*). For example, the second exhaust valve may be opened about 90 degrees past BDC and may be closed within 10 degrees past TDC. In the example shown in FIG. 3 for the second exhaust valve, curves 310*a* and 310*b* may have the same duration D3. In other examples, the durations may be varied along with the phasing of the second exhaust valve.

Additionally, the first exhaust valve may be opened at a first timing with a first amount of valve lift L2 while the second exhaust valve may be opened with a second amount of valve lift L3 (curve 310*a*) and the CIV may be opened with a third amount of valve lift L5. Further still, the first exhaust valve may be opened at the first timing for a duration D2 while the second exhaust valve may be opened for a duration D3 and the CIV may be opened for a duration D5. It will be appreciated that in alternate embodiments, the two exhaust valves may have the same amount of valve lift and/or same duration of opening while opening at differently phased timings.

In this way, by using staggered valve timings, engine efficiency and power can be increased by separating exhaust gases released at higher pressure (e.g., expanding blow-down exhaust gases in a cylinder) from residual exhaust gases at low pressure (e.g., exhaust gases that remain in the cylinder after blow-down) into the different passages. By conveying low pressure residual exhaust gases as EGR along with blowthrough air to the compressor inlet, combustion chamber temperatures can be lowered thereby, reducing knock and spark retard from maximum torque. Further, since the exhaust gases at the end of the stroke are directed to either downstream of a turbine or upstream of a compressor which are both at lower pressures, exhaust pumping losses can be minimized to improve engine efficiency.

Thus, exhaust gases can be used more efficiently than simply directing all the exhaust gas of a cylinder through a single, common exhaust port to a turbocharger turbine. As such, several advantages may be achieved. For example, the average exhaust gas pressure supplied to the turbocharger can be increased by separating and directing the blowdown pulse into the turbine inlet to improve turbocharger output. Additionally, fuel economy may be improved because blow-through air is not routed to the catalyst, being directed to the compressor inlet instead, and therefore, excess fuel may not be injected into the exhaust gases to maintain a stoichiometric ratio.

Figure 4:
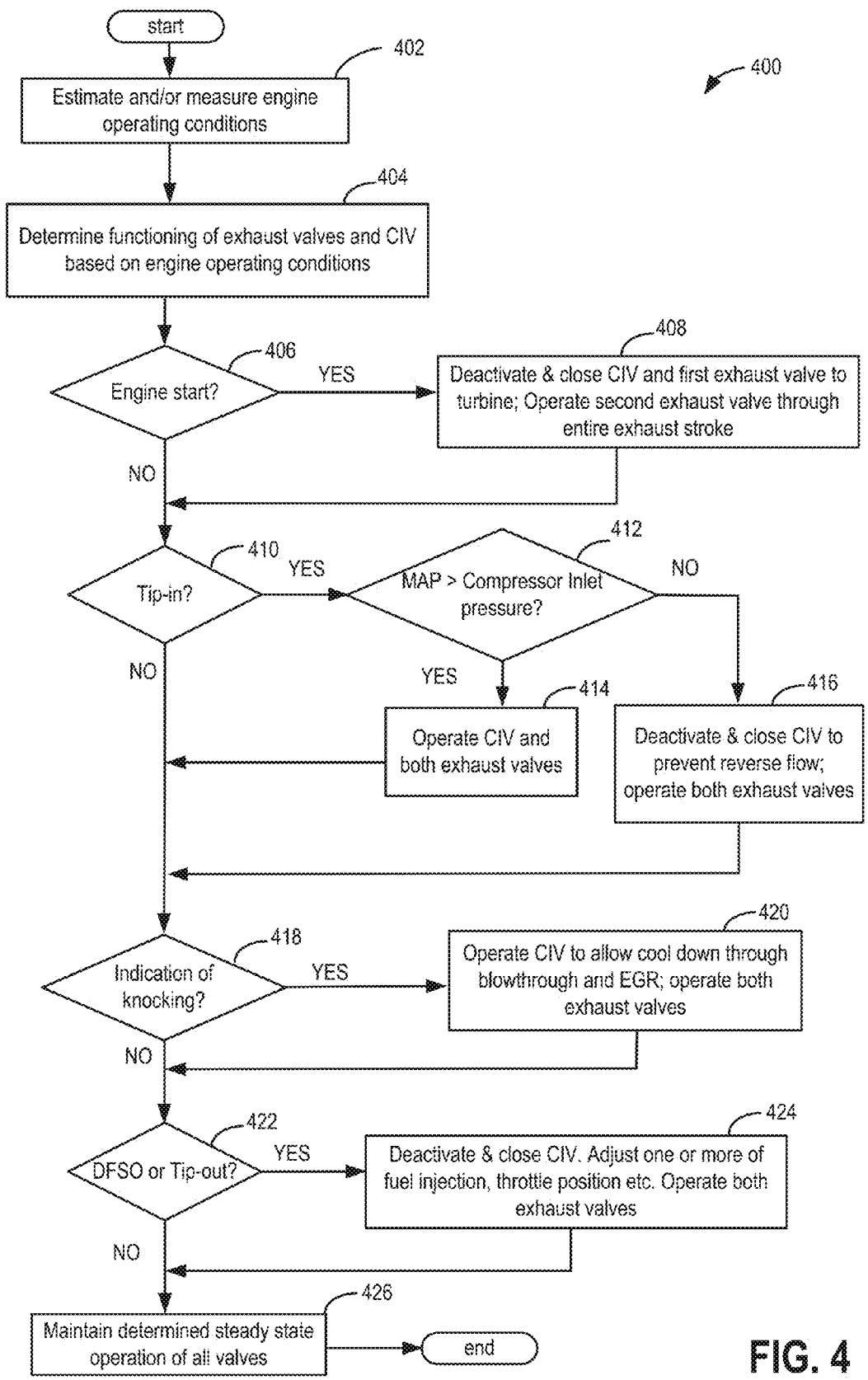
FIG. 4 is an example flow chart illustrating a routine to activate a compressor inlet valve based on various engine operating conditions.

Now turning to FIG. 4, an example routine 400 is shown for operating the compressor inlet valve (CIV) and the two exhaust valves according to engine conditions. Specifically, the routine may determine different valve positions based on engine operating conditions including combustion stability, engine limitations, and transients amongst other conditions. Further, the valves are operated as explained below through one or more combustion cycles for the duration of the specific engine condition.

At 402, engine operating conditions may be estimated and/or measured. These may include, for example, ambient temperature and pressure, engine temperature, engine speed, crankshaft speed, battery state of charge, fuels available, catalyst temperature, driver demanded torque, etc. At 404, based on the estimated engine operating conditions, the functioning and operation of all valves may be determined. For example, at steady state conditions, the CIV may be operated during an engine combustion cycle to enable blowthrough, reduce exhaust pumping losses and improve torque.

At 406, it may be determined if engine start conditions are present. An engine start may include cranking the engine from rest via a motor, such as a starter motor. If engine start conditions are present, at 408 the CIV and the first exhaust valve are deactivated and maintained closed while the entire exhaust portion is delivered to the emission control device via the second exhaust valve. To elaborate, during a combustion cycle under engine start conditions, the second exhaust valve may fully open just before the exhaust stroke commences and may be fully closed at the onset of the intake stroke. During a cold-start, the hot exhaust gases may assist in bringing the emission control device to light-off temperature. During a hot-start, the initial emissions may be cleaned out by the emission control device which has attained light-off temperature.

At 410, it may be determined if a tip-in is expected. In order to speed exhaust turbine spool-up in a turbocharged system in preparation for tip-in, the first exhaust valve may be activated, in addition to the second exhaust valve, to direct the blowdown portion of the exhaust to the turbine. Specifically, the first exhaust valve may be opened just as the exhaust stroke commences and closed well before the end of the exhaust stroke to target the blowdown pulse to the turbine. The second exhaust valve may be opened about midway through the exhaust stroke and closed well before the end of the exhaust stroke to channel the scavenged portion of the exhaust to the emission control device.

If a tip-in is confirmed, at 412, the routine may determine if manifold air pressure (MAP) is higher than turbo-compressor inlet pressure. If MAP is confirmed to be higher, the CIV may be activated, at 414, to open towards the end of the exhaust stroke to allow EGR and blowthrough air to be transferred to the compressor inlet.

If MAP is lower than compressor inlet pressure, the CIV may be closed or maintained closed and deactivated to prevent reverse air flow. For example, under throttled conditions the intake air may want to flow from upstream of the compressor to the intake manifold via the combustion chamber. To prevent this reverse flow, the CIV may be deactivated and closed while the second exhaust valve may be opened about halfway through the exhaust stroke and closed at or just past the onset of the intake stroke.

At 418, it may be determined if there is any indication of engine knock. If the presence of engine knock is confirmed, at 420, the routine includes operating the CIV to enable EGR and blowthrough which can cool combustion chamber temperatures. Specifically, the CIV may be opened towards the end of the exhaust stroke and closed well past the onset of the intake stroke. As described earlier, the two exhaust valves may be operated to direct the blowdown and scavenged portions to the turbine and the emission control device, respectively. Engine knock may be due to an abnormal combustion event occurring in a cylinder after a spark ignition event of the cylinder. To promote combustion stability, additional fuel may be injected into the blowthrough air to enrich the EGR gases. By injecting fuel to enrich EGR, engine knock may be mitigated without the use of spark retard, thereby, improving engine torque.

Next, at 422, it may be determined if deceleration fuel shut-off (DFSO) or tip-out conditions are met. The DFSO event may be in response to torque demand being lower than a threshold, such as during a tip-out. Therein, cylinder fuel injection may be selectively stopped. If a DFSO or tip-out is confirmed, then at 424, the CIV may be deactivated and closed or maintained closed to reduce an amount of residuals delivered to the engine intake during the deceleration. Specifically, the CIV is closed and/or maintained closed during entire combustion cycles as long as DFSO or tip-out lasts. Further, the exhaust gases may be channeled as two portions: one earlier blowdown portion via the first exhaust valve and a second scavenged portion via the second exhaust valve. Engine settings may be adjusted to maximize engine torque response after exit from DFSO. For example, the throttle may be positioned so as to allow for best transient response on tip-in.

If none of the engine conditions described above are present, at 426, the valves may be operated based on steady state conditions. In one example, during steady state conditions, if MAP is higher than compressor inlet pressure, the CIV may be activated and opened towards the end of the exhaust stroke and closed well after the onset of the intake stroke similar to step 414. In another example, if MAP is lower than the compressor inlet pressure, the CIV may be deactivated and maintained closed as at step 416. The two exhaust valves may be operated as described earlier: if the CIV is operational during the combustion cycle, both exhaust valves close well before the end of the exhaust stroke. If the CIV is inoperative, the blowdown portion of the exhaust continues to be delivered to the turbine via the first exhaust while the second exhaust valve drains the remaining exhaust gases to the emission control device. Herein, blowthrough and EGR may not be channeled to the compressor inlet. In yet another example, under non-steady state conditions, valve operation may be modified and adapted to existing conditions.

Various examples of engine conditions and resulting valve adjustments are now elaborated with reference to FIG. 5. Specifically, table 500 lists example combinations of exhausting a cylinder along three distinct passages comprising a first exhaust passage through a first exhaust valve leading to an exhaust turbine inlet, a second passage through a second exhaust valve leading to an emission control device and a third passage from a compressor inlet valve to upstream of the turbo-compressor. As such, the three portions of exhaust may be expelled separately and at different times within the same engine combustion cycle as elaborated earlier with reference to FIG. 3. Further, during all conditions described below, the intake valves are operational as described with reference to FIG. 3. Both intake valves may be opened fully at the onset of the intake stroke (e.g., at or just before TDC exhaust stroke) and closed fully at the end of the intake stroke (e.g., at or just after BDC intake stroke).

During an engine start condition, the CIV and the first exhaust valve may be deactivated and maintained closed while the second exhaust valve is operational and open through the entire exhaust stroke (for e.g., from just before the end of the power stroke BDC to just after the end of the exhaust stroke TDC) whereby all the exhaust is directed to the emission control device. Therefore, as the engine is started from rest or shutdown, neither the turbine nor the compressor inlet receives any portion of the exhaust. During a tip-in, both exhaust valves may be activated and operational. A blowdown portion of the exhaust may be directed to the turbine by opening the first exhaust valve just before the end of the power stroke BDC and closing it before the end of the exhaust stroke. A second portion of the exhaust gases after blowdown may be delivered to an emission control device by opening the second exhaust valve about midway during the exhaust stroke. Both exhaust valves may be closed before the end of the exhaust stroke TDC. A final portion of low pressure exhaust (LP-EGR) combined with fresh blowthrough air may be conveyed to the turbo-compressor inlet by operating the CIV to open towards the end of the exhaust stroke and by maintaining a positive valve overlap with one or more intake valves during the intake stroke. The CIV may be closed well after the onset of the intake stroke for e.g., well past TDC. Thus, the exhaust turbine may spool up for a tip-in with energy recovered from the blowdown pulse of the exhaust while knock and other combustion instabilities may be reduced by recirculating LP-EGR and blowthrough via the compressor inlet. The operation of the CIV may depend on MAP. The CIV may be opened during the combustion cycle solely when the manifold air pressure is higher than compressor inlet pressure to enable the flow of fresh intake air through the cylinder and the CIV to transfer residual low pressure exhaust gases to the compressor inlet.

When an engine is operating under throttled conditions, the manifold air pressure may be lower than the compressor inlet pressure. Therefore, the CIV may be deactivated and maintained closed during the cycle while the two exhaust valves are operational to drain combusted gases from the cylinder. The blowdown pulse from the exhaust may be directed to the turbine of the turbocharger while the scavenged portion of the exhaust may be conveyed to the emission control device. The first exhaust valve may open just before the exhaust stroke begins and may close well before the exhaust stroke ends. The second exhaust valve may open about halfway through the exhaust stroke and close at TDC or just after the end of the exhaust stroke past TDC.

During unstable combustion conditions when engine knock may be present, the CIV may be activated and opened towards the end of the exhaust stroke and may be fully closed well after the intake stroke is initiated to allow for EGR and blowthrough. Additionally, extra fuel may be injected into the blowthrough air to make the EGR richer and improve combustion stability. Thus, the CIV may transfer a mix of uncombusted fuel, low pressure exhaust gases (as LP-EGR) and blowthrough air to the compressor inlet for recirculation to the cylinder. The two exhaust valves are operated similarly to that described for the tip-in condition and may be opened during part of the exhaust stroke and closed well before the end of the exhaust stroke.

During a tip-out condition, as the engine is disabled, the CIV may be deactivated and maintained closed to prevent any EGR from flowing through the engine. The two exhaust valves are operational whereby, the first portion of exhaust gases is discharged through the first exhaust valve to the turbine while the remaining portion of exhaust gases is discharged through the second exhaust valve to the emission control device. The first exhaust valve is opened at or just before the end of the power stroke and is closed well before the end of the exhaust stroke. The second exhaust valve is opened halfway through the exhaust stroke and closed just after the intake stroke commences.

Figure 6:
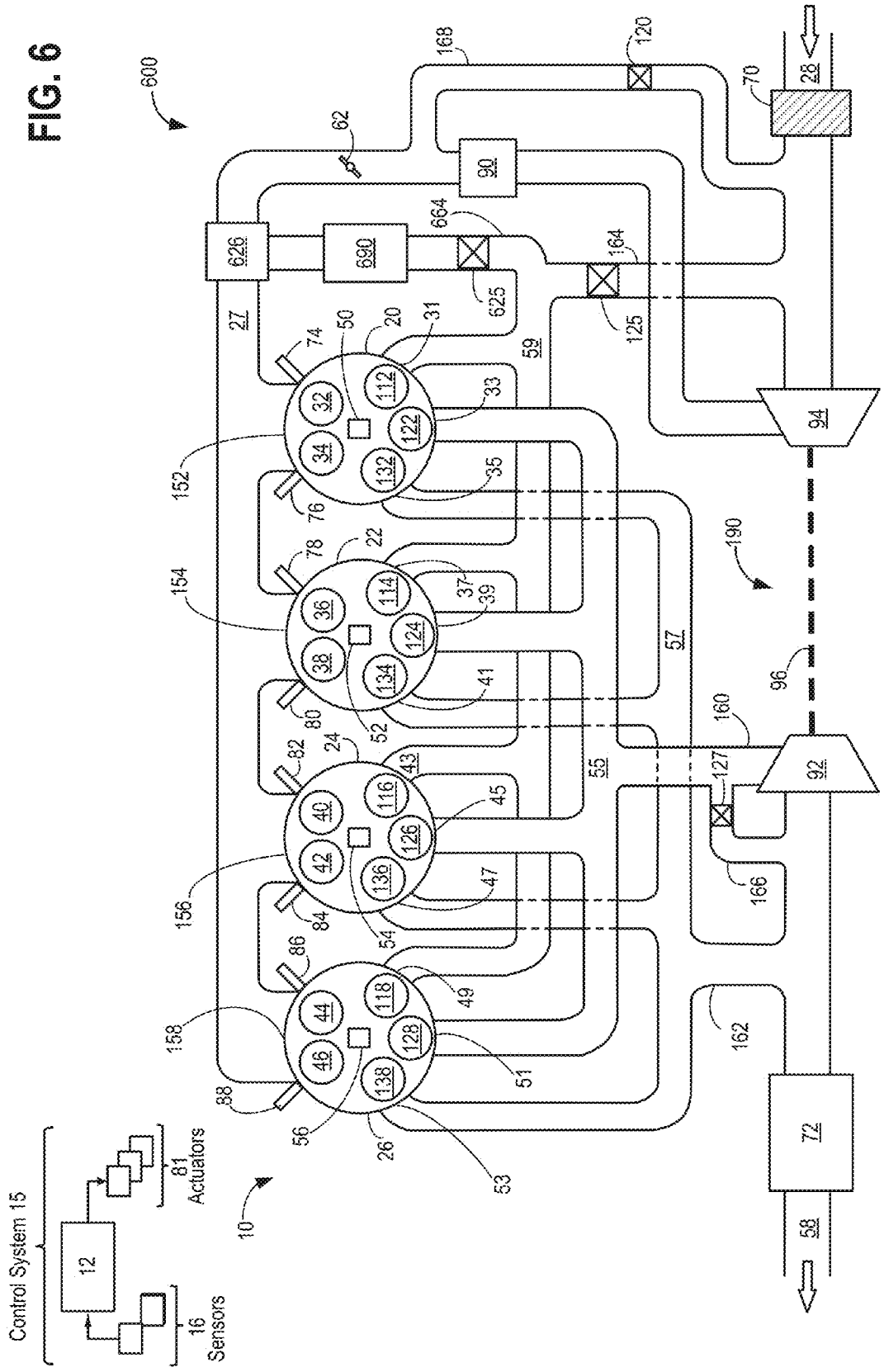
FIG. 6 schematically portrays a second embodiment of the turbocharged engine system of FIG. 1.

Turning now to FIG. 6, it shows another example embodiment of engine 10 of FIG. 1. As such, FIG. 6 depicts a second example embodiment 600 of engine 10. Further, multiple components of engine 10 depicted in second example embodiment 600 of FIG. 6 may be the same as those in FIG. 1. Accordingly, these components are numbered the same and are not re-introduced.

As such, engine 10 of FIG. 6 may be the same as engine 10 of FIG. 1 except second example embodiment 600 includes a post-compressor conduit 664 (or passage 664). In other words, a fourth exhaust passage, namely post-compressor conduit 664, may be included in the second example embodiment 600 (compared to engine embodiment of FIG. 1) in addition to the previously introduced three distinct exhaust passages. Specifically, post-compressor conduit 664 fluidically couples manifold 59 via a second exhaust recirculation valve 625 to a location that is downstream of each of compressor 94 and intake throttle 62. Thus, post-compressor conduit 664 couples manifold 59 to a location that is post-compressor.

For example, passage 664 may fluidically couple manifold 59 to immediately upstream of intake manifold 27. As shown in FIG. 6, post-compressor conduit 664 may be coupled to intake passage 28 downstream of intake throttle 62 at mixer 626. Alternative embodiments may include fluidic coupling of the post-compressor conduit 664 to downstream of the compressor 94 but upstream of intake throttle 62. Mixer 626 may provide even mixing between gases received via post-compressor conduit 664 from manifold 59 and fresh intake air received from intake throttle 62 via intake passage 28. In other words, spatial and temporal mixing of exhaust gases, blowthrough air, and fresh intake air may occur within mixer 626. An EGR cooler 690 is also included within post-compressor conduit 664 to cool exhaust gases received from manifold 59.

Second exhaust recirculation valve 625 (or second ERV 625) may be a binary (e.g., on/off) valve that is adjusted between one of fully closed and fully open. When second ERV 625 is fully closed, gases from manifold 59 may not flow through second ERV 625 towards mixer 626. When fully open, second ERV 625 allows fluid flow therethrough. As will be detailed further below, during a specific mode of operation, exhaust gases from cylinder 20 of engine 10 may flow past compressor inlet valve 112 to manifold 59 along post-compressor conduit 664 via second ERV 625 through EGR cooler 690 into mixer 626. Further, exhaust gases from cylinder 20 of engine 10 may be mixed with fresh intake air received from intake throttle 62 in mixer 626 and the entire mixture may enter intake manifold 27 and flow into each cylinder of engine 10. In alternative embodiments, second ERV 625 may be a continuously variable valve capable of assuming positions between fully-closed and fully-open.

Thus, combusted gases exiting a cylinder of second example embodiment 600 of engine 10 may be directed to one or more of four distinct locations via four separate passages which include two exhaust passages formed by the split exhaust manifold, one passage connecting the compressor inlet valve to upstream of the turbo-compressor, and the post-compressor conduit (or fourth exhaust passage) coupling the compressor inlet valve to downstream of the turbo-compressor. To elaborate, exhaust gases from the plurality of cylinders 20, 22, 24, and 26 may be directed to one or more of at least three locations including directly to emission control device 72 (via pipe 162), directly to turbine 92 (via pipe 160), and directly to inlet of compressor 94 via pipe 164 and ERV 125. In addition to the three locations described above, combusted gases from cylinder 20 (alone) may be directed to a fourth location (via using cam profile switching and second ERV 625) that is downstream of compressor 94 and downstream of intake throttle 62 via post-compressor conduit 664. The exhaust gases may be targeted to specific locations based on engine operating conditions as will be described further below in reference to FIG. 8. As such, the status of first ERV 125 and second ERV 625 may also change based on operating modes and resulting desired target locations for the EGR. When EGR is desired at a location upstream of compressor 92, first ERV 125 may be opened while second ERV 625 may be fully closed. If EGR is desired at the post-compressor location (e.g., mixer 626), first ERV 125 may be fully closed while second ERV 625 is fully opened (from closed).

Herein, exhaust gases exiting the plurality of cylinders of engine 10 of FIG. 6 may be directed to desired locations by using variable valve timing such as variable cam timing along with a cam profile switching system. FIG. 7 presents a more detailed view 700 of an example variable cam timing (VCT) system 702 and cam profile switching (CPS) system 704 operatively coupled to second example embodiment of engine 10 of FIG. 6. It will be appreciated that engine system components introduced in FIG. 1 (and FIG. 6) are numbered similarly and not reintroduced. It will also be appreciated that multiple components of engine 10 are not depicted in FIG. 7 for the sake of simplicity and clarity of view. It will additionally be noted that, though not shown, intake valves of each cylinder of engine 10 may be actuatable by an intake camshaft operatively coupled to VCT system 702 and CPS system 704. However, operation of the intake valves of each cylinder of engine 10 is not described herein, and the description is focused on operating the exhaust valves and the compressor inlet valves of each cylinder.

Each exhaust valve and compressor inlet valve of each cylinder of engine 10 is actuatable between an open position allowing exhaust gas out of a respective cylinder and a closed position substantially retaining gas within the respective cylinder. FIG. 7 shows exhaust valves 138, 128, 136, 126, 134, 124, 132, and 122 as well as compressor inlet valves 118, 116, 114, and 112 being actuated by a common exhaust camshaft 714. Exhaust camshaft 714 includes a plurality of exhaust cams configured to control the opening and closing of the exhaust valves. Each exhaust valve may be controlled by one or more exhaust cams, which will be described further below. In some embodiments, one or more additional exhaust cams may be included to control the exhaust valves. Further, exhaust actuator systems may enable the control of exhaust valves.

Exhaust valve actuator systems may further include push rods, rocker arms, tappets, etc. Such devices and features may control actuation of the intake valves and the exhaust valves by converting rotational motion of the cams into translational motion of the valves. In other examples, the valves can be actuated via additional cam lobe profiles on the camshafts, where the cam lobe profiles between different valves may provide varying cam lift height, cam duration, and/or cam timing. However, alternative camshaft (overhead and/or pushrod) arrangements could be used, if desired. In still other examples, exhaust valves and intake valves may be actuated by a common camshaft. However, in alternate embodiments, at least one of the intake valves and/or exhaust valves may be actuated by its own independent camshaft or other device.

Engine 10 of second example embodiment 600 may include a controller, such as controller 12 described in reference to FIG. 1, controlling a subset of the plurality of cylinders in a manner different from a remaining number of the plurality of cylinders. Herein, a subset of the plurality of cylinders includes a number of cylinders less than the total number of the plurality of cylinders. For example, cylinder 20 (a subset) may be controlled in a distinct manner relative to controlling the remaining cylinders 22, 24, and 26 of the plurality of cylinders 20, 22, 24, and 26. Specifically, exhaust valves 132, 122 and compressor inlet valve 112 of cylinder 20 may be actuated differently relative to exhaust valves 138, 128, 136, 126, 134, and 124, and compressor inlet valves 118, 116, and 114 of the remaining cylinders 22, 24, and 26. As such, exhaust valves 132, 122 and compressor inlet valve 112 of cylinder 20 may be operated by cams with different and distinct profiles from cams actuating exhaust valves 138, 128, 136, 126, 134, and 124, and compressor inlet valves 118, 116, and 114.

Exhaust valves 134, 136, and 138 that are fluidically coupled to exhaust manifold 57 and thereon to exhaust emission device 72 via pipe 162 may be actuated by a first exhaust cam 716 and a second exhaust cam 718 arranged on common exhaust camshaft 714. First exhaust cams 716 may have a first cam lobe profile providing a first exhaust duration and lift. In the example of FIG. 7, first exhaust cams 716 of cylinders 22, 24, and 26 may have a similar first cam lobe profile which opens respective exhaust valves for a given duration and lift. Second exhaust cams 718 may have a second cam lobe profile providing a second exhaust duration and lift. In the example of FIG. 7, second exhaust cams 718 of cylinders 22, 24, and 26 may have a similar second cam lobe profile which opens respective exhaust valves for a given duration and lift. As such, first exhaust cams 716 may have a different and distinct cam profile relative to that of the second exhaust cams 718. For example, second exhaust cams 718 may open respective exhaust valves for a longer duration than the duration of opening provided by first exhaust cams 716.

Exhaust valves 124, 126, and 128 channeling the blow-down portion of the exhaust gases through exhaust manifold 55 and pipe 160 to the turbine 92 may be actuated by each of a third exhaust cam 720, a fourth exhaust cam 722, and a fifth exhaust cam 724. Third exhaust cams 720 may have a third cam lobe profile providing a third exhaust duration and lift. In the example of FIG. 7, third exhaust cams 720 of cylinders 22, 24, and 26 may have a similar third cam lobe profile which opens respective exhaust valves for a given duration and lift. Fourth exhaust cams 722 may have a fourth cam lobe profile providing a fourth exhaust duration and lift. In the example of FIG. 7, fourth exhaust cams 722 of cylinders 22, 24, and 26 may have a similar fourth cam lobe profile which opens respective exhaust valves for a given duration and lift. As such, third exhaust cams 720 may have a different and distinct cam profile relative to that of the fourth exhaust cams 722. For example, fourth exhaust cams 722 may open respective exhaust valves for a longer duration than the duration of opening provided by third exhaust cams 720. Further, third exhaust cams 720 may have a different and distinct cam profile relative to that of the first exhaust cams 716 and second exhaust cams 718. Similarly, fourth exhaust cams 722 may have a different and distinct cam profile relative to that of the first exhaust cams 716 and second exhaust cams 718.

Fifth exhaust cams 724 are depicted as null cam lobes which may have a profile to maintain their respective exhaust valves 124, 126, and 128 in the fully closed (e.g., deactivated) position through one or more engine cycles. Thus, null cam lobes may assist in deactivating corresponding exhaust valves 124, 126, and 128 in respective cylinders 22, 24, and 26 during certain modes.

Compressor inlet valves 114, 116, and 118 of cylinders 22, 24, and 26 fluidically coupled to exhaust manifold 59 alone may be actuated by each of a sixth exhaust cam 726 and a seventh exhaust cam 728. Sixth exhaust cams 726 may have a sixth cam lobe profile providing a sixth exhaust duration and lift. In the example of FIG. 7, sixth exhaust cams 726 of cylinders 22, 24, and 26 may have a similar sixth cam lobe profile which opens respective exhaust valves for a given duration and lift. Sixth exhaust cams 726 may have a different and distinct cam profile relative to that of previously introduced exhaust cams. Seventh exhaust cams 728 may be null cam lobes that maintain compressor inlet valves 114, 116, and 118 fully closed when desired. Thus, compressor inlet valves in cylinders 22, 24, and 26 may be deactivated during certain engine conditions.

Exhaust valves 132 and 122 of cylinder 20 may be individually controlled by a separate set of cams. Specifically, exhaust valve 132 communicating with exhaust manifold 57 may be actuated by eighth exhaust cam 730, ninth exhaust cam 732, and null exhaust cam 733. Eighth exhaust cam 730 may have an eighth cam lobe profile providing an eighth exhaust duration and lift. Ninth exhaust cam 732 may have a ninth cam lobe profile providing a ninth exhaust duration and lift. Eighth exhaust cam 730 may have a different and distinct cam profile relative to that of previously introduced cams as well as ninth exhaust cam 732. Further, null exhaust cam 733 may have a profile that maintains exhaust valve 132 at its fully closed position (e.g., deactivated) when desired.

Similarly, exhaust valve 122 fluidically coupled to exhaust manifold 55 may be actuated by tenth exhaust cam 734, eleventh exhaust cam 736, and null exhaust cam 738. Tenth exhaust cam 734 may have a tenth cam lobe profile providing a tenth exhaust duration and lift. Eleventh exhaust cam 736 may have an eleventh cam lobe profile providing an eleventh exhaust duration and lift. Eleventh exhaust cam 736 may have a different and distinct cam profile relative to that of previously introduced cams as well as tenth exhaust cam 734. Further, null exhaust cam 738 may have a profile that maintains exhaust valve 122 at its fully closed position (e.g., deactivated) when desired.

Compressor inlet valve 112 of cylinder 20 may be actuated by twelfth exhaust cam 740, thirteenth exhaust cam 742, and null exhaust cam 744. Twelfth exhaust cam 740 may have a twelfth cam lobe profile providing a twelfth exhaust duration and lift. Thirteenth exhaust cam 742 may have a thirteenth cam lobe profile providing a thirteenth exhaust duration and lift. Twelfth exhaust cam 740 may have a different and distinct cam profile relative to that of previously introduced cams as well as that of thirteenth exhaust cam 742. Further, null exhaust cam 744 may have a profile that maintains compressor inlet valve 112 at its fully closed position (e.g., deactivated) when desired.

Other embodiments may include different mechanisms known in the art for deactivating the exhaust valves and compressor inlet valves in cylinders. Such embodiments may not utilize null cam lobes for deactivation. For example, these mechanisms may include switching tappets, switching rocker arms, or switching hydraulic roller finger followers.

Thus, each of exhaust valves 138, 136, and 134 coupled to manifold 57 may be actuated by one of two exhaust cams. Exhaust valves 128, 126, and 124, however, may be actuated by one of three distinct exhaust cams, while compressor inlet valves 118, 116, and 114 may be actuated by one of two distinct exhaust cams. Further still, each of exhaust valves 128, 126, and 124, and each of compressor inlet valves 118, 116, and 114 may be deactivated by at least one null exhaust cam during certain engine conditions. Exhaust valves 132 and 122, and compressor inlet valve 112 of cylinder 20 may each be actuated by one of three distinct exhaust cams. Furthermore, each of exhaust valves 132 and 122, and compressor inlet valve 112 of cylinder 20 may be deactivated via respective null exhaust cams when desired.

Each of the exhaust valves and the compressor inlet valve may be actuated by a respective actuator system operatively coupled to controller 12. Therefore, exhaust valves 138, 128, and compressor inlet valve 118 of cylinder 26 may be actuated via actuator system 706. Similarly, exhaust valves 136, 126, and compressor inlet valve 116 of cylinder 24 may be actuated via actuator system 708. Further, exhaust valves 134, 124, and compressor inlet valve 114 of cylinder 22 may be actuated via actuator system 710. Further still, exhaust valves 132, 122, and compressor inlet valve 112 of cylinder 20 may be actuated via actuator system 712.

Other embodiments may include reduced actuator systems or different combinations of actuator systems without departing from the scope of the present disclosure. For example, the intake valves and exhaust valves of each cylinder may be actuated by a single actuator.

CPS system 704 may be configured to translate specific portions of exhaust camshaft 714 longitudinally, thereby causing operation of exhaust valves and compressor inlet valves of each cylinder to vary between different exhaust cams detailed earlier. For example, the operation of exhaust valves 128, 126, and 124 may vary based on whether third exhaust cam 720, fourth exhaust cam 722, or fifth exhaust cam 724 is selected. Likewise, operation of compressor inlet valve 112 of cylinder 20 may vary based on which of twelfth exhaust cam 740, thirteenth exhaust cam 742, or null exhaust cam 744 is actuating compressor inlet valve 112.

VCT system 702 includes exhaust camshaft phaser 765 for changing valve timing. An intake camshaft phaser may be included (though not specifically shown) without departing from the scope of this disclosure. VCT system 702 may be configured to advance or retard valve timing by advancing or retarding cam timing (an example engine operating parameter) and may be controlled via controller 12. VCT system 702 may be configured to vary the timing of valve opening and closing events by varying the relationship between the crankshaft position and the camshaft position. For example, VCT system 702 may be configured to rotate exhaust camshaft 714 independently of the crankshaft to cause the valve timing to be advanced or retarded. In some embodiments, VCT system 702 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically powered, or electrically actuated, or combinations thereof.

In an optional embodiment (dashed lines) wherein actuator systems 706, 708, 710, and 712 include rocker arms to actuate the different exhaust cams coupled to common exhaust camshaft 714, CPS system 704 may be operatively coupled to solenoid S1 and solenoid S2, which in turn may be operatively coupled to the actuator systems. Herein, the rocker arms may be actuated by electrical or hydraulic means via solenoids S1 and S2 to follow a selected exhaust cam for each exhaust valve and compressor inlet valve. As depicted, solenoid S1 is operatively and communicatively coupled solely to actuator system 712 (via dashed line 760) and not operatively (or communicatively) coupled to actuator systems 706, 708, and 710. Likewise, solenoid S2 is operatively and communicatively coupled to actuator systems 706 (via 772), 708 (via 774), and 710 (via 776), and not operatively (or communicatively) coupled to actuator system 712.

To elaborate, solenoid S1 may be operatively and communicatively coupled only to actuator system 712 of cylinder 20 and not to actuator systems 706, 708, and 710 coupled to cylinders 26, 24, and 22 respectively. Further, solenoid S2 may be operatively and communicatively coupled to 706, 708, and 710 but not operatively and communicatively coupled to 712. Herein, rocker arms may be actuated by electrical or hydraulic means to follow one of the previously described cams for each exhaust valve.

In this way, CPS system 704 may switch between cams for opening the respective exhaust valve for a specific duration and/or lift and/or timing. CPS system 704 may receive signals from controller 12 to switch between different cam profiles for different cylinders in engine 10 based on engine operating conditions.

FIG. 8 shows an example map 800 featuring engine load-engine speed plots. Specifically, the map depicts different speed-load regions when distinct modes of operating the exhaust valves and compression inlet valves of the various cylinders of engine 10 may be employed. Map 800 presents engine speed plotted along the x-axis and engine load (or brake mean effective pressure (BMEP)) plotted along the y-axis. Line 802 represents a highest load that a given engine can operate under at a given speed. Map 800 further includes three regions of distinct engine load and engine speed combinations wherein the cylinders of engine 10 may be operated in diverse manners to provide lower pumping losses and higher engine efficiencies.

Region 808, defined by very low engine loads, may include engine operating conditions such as engine cold start, engine idle, etc. As a non-limiting example, these very light engine loads may include a range of 0-2 bar BMEP. Herein, engine torque demand may be significantly low. During these very low engine load conditions, the cylinders may be operated to direct a substantial portion, e.g. almost 100%, of their exhaust to the exhaust catalyst, e.g. emission control device 72.

Accordingly, cam profiles may be switched by CPS system 704 of FIG. 7 to actuate exhaust valves 138, 136, and 134 via second exhaust cams 718. Specifically, second exhaust cams 718 may actuate the corresponding exhaust valves to open for the entire duration of the respective exhaust strokes in the cylinders 26, 24, and 22. Concurrently, exhaust valve 132 of cylinder 20 may be actuated by ninth exhaust cam 732. Herein, exhaust valve 132 may be held open for the entire duration of the exhaust stroke in cylinder 20. Simultaneously, exhaust valves 128, 126, 124, 122, and compressor inlet valves 118, 116, 114, and 112 of respective cylinders 26, 24, 22, and 20 may be held fully closed. Specifically, exhaust valves 128, 126, and 124 may be held closed (e.g., deactivated) by actuating these exhaust valves 128, 126, and 124 via their respective null exhaust cams e.g. fifth exhaust cams 724 while compressor inlet valves 118, 116, and 114 are held closed via their respective null cams e.g., seventh exhaust cams 728. Meanwhile, exhaust valve 122 of cylinder 20 may be held closed by actuating null cam 738 while compressor inlet valve 112 of cylinder 20 may be held at fully closed via null cam 744.

Alternatively, a smaller portion of exhaust, e.g., a portion of the blowdown pulse, may be directed to the exhaust turbine from all cylinders 20, 22, 24, and 26 while a larger portion of exhaust from all cylinders may be guided to the emission control device 72.

Region 806 may represent lower to medium engine loads e.g., 2-10 bar BMEP. Herein, desired engine power may be low e.g. during cruising conditions though higher relative to that desired in region 808. In other words, region 806 represents engine loads higher than those in region 808 (and lower than those in region 804) albeit the engine loads in region 806 may be classified, in this disclosure, as lower to medium loads.

When the engine is operating in region 806, exhaust gases from a subset of the plurality of cylinders may be recirculated to engine 10. For example, CPS system 704 may communicate with actuator 712 to switch between the various cams coupled to exhaust valves 132, 122, and compressor inlet valve 112 of cylinder 20 during low to medium engine loads. Specifically, compressor inlet valve 112 may be held open for the entire duration of an exhaust stroke to direct all exhaust from cylinder 20 to manifold 59. As such, exhaust valves 132 and 122 may each be held closed by being actuated by their respective null cams 733 and 738. Further, by closing first ERV 125 and opening second ERV 625, exhaust from cylinder 20 received in manifold 59 may be guided via post-compressor conduit 664 to mixer 626 located downstream of compressor 94.

At the same time and within a first engine cycle as the compressor inlet valve 112 of cylinder 20 is held open throughout the duration of the exhaust stroke, exhaust from the remaining cylinders, e.g. cylinders 26, 24, and 22 is directed to each of the turbine and the emissions control device during the same first engine cycle. Specifically, exhaust valves 128, 126, and 124 may be opened to channel a first portion of the exhaust, namely the blowdown portion, to turbine 92 via a first passage (pipe 160). Meanwhile, exhaust valves 138, 136, and 134 may direct only a second portion of exhaust gases following the blowdown portion to emission control device 72 via a second passage (pipe 162). The second portion of exhaust gases may be the scavenging portion of exhaust gases including a small fraction of residual exhaust gases. As such, exhaust valves 128, 126, and 124 may be open during a former portion of the exhaust stroke while exhaust valves 138, 136, and 134 may be open during a latter portion of the same exhaust stroke. Specifically, compressor inlet valves 118, 116, and 114 of respective cylinders 26, 24, and 22 may be deactivated and closed during engine operation in region 806.

Region 804 includes high engine loads (e.g., greater than 10 bar BMEP) wherein the engine is operating to fulfill a high torque demand. As an example, high engine load conditions may include tip-in events, vehicle travel up an incline, etc. Further, engine loads in region 804 may be higher than engine loads in each of region 806 and region 808. As such, region 804 may include significantly higher engine loads.

When the engine is operating in region 804, a significant portion of the exhaust may be delivered to the turbine of the turbocharger to produce the desired higher torque demand. Further still, to reduce knocking, cooling of combustion chambers may be enabled by providing blowthrough of fresh intake air. Accordingly, the engine (including the plurality of cylinders) may operate as described in reference to FIG. 5 during the tip-in condition. Specifically, a blowdown portion of the exhaust may be directed to the turbine by opening the first exhaust valve (e.g., exhaust valves 128, 126, 124, and 122) just before the end of the power stroke BDC and closing it before the end of the exhaust stroke. A second portion of the exhaust gases after blowdown may be delivered to the emission control device by opening the second exhaust valve (e.g., exhaust valves 138, 136, 134, and 132) about midway during the exhaust stroke. Both exhaust valves may be closed before the end of the exhaust stroke TDC. A final portion of low pressure exhaust (LP-EGR) combined with fresh blowthrough air may be conveyed to the turbo-compressor inlet by operating the CIV (e.g. compressor inlet valves 118, 116, 114, and 112) to open towards the end of the exhaust stroke and by maintaining a positive valve overlap with one or more intake valves during the intake stroke.

It should be noted that when the relative loads are indicated as being high or low, the indication refers to the relative load compared to the range of available loads. Thus, low engine loads may be lower relative to each of medium and higher engine loads. High engine loads may be higher relative to each of medium (or moderate) and lower engine loads. Medium or moderate engine loads may be lower relative to high or very high engine loads. Further, medium or moderate engine loads may be greater relative to low engine loads. Furthermore, very low engine loads may include engine loads that are lower than low engine loads, as well as lower than medium and high engine loads.

Figure 9A:
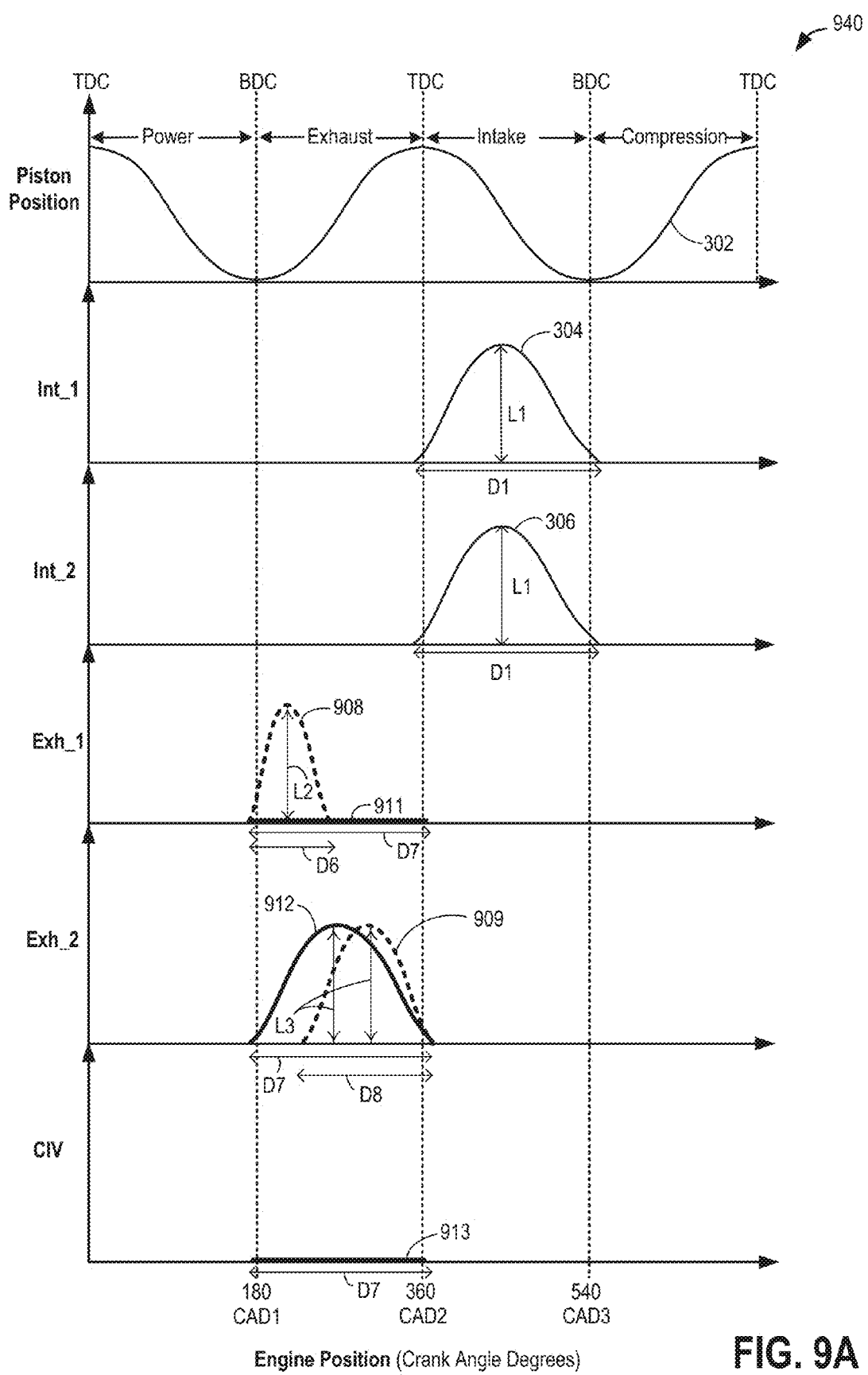
FIGS. 9A, 9B, and 9C depict example exhaust valve timings for cylinders of the second embodiment of the turbocharged engine.
Figure 9B:
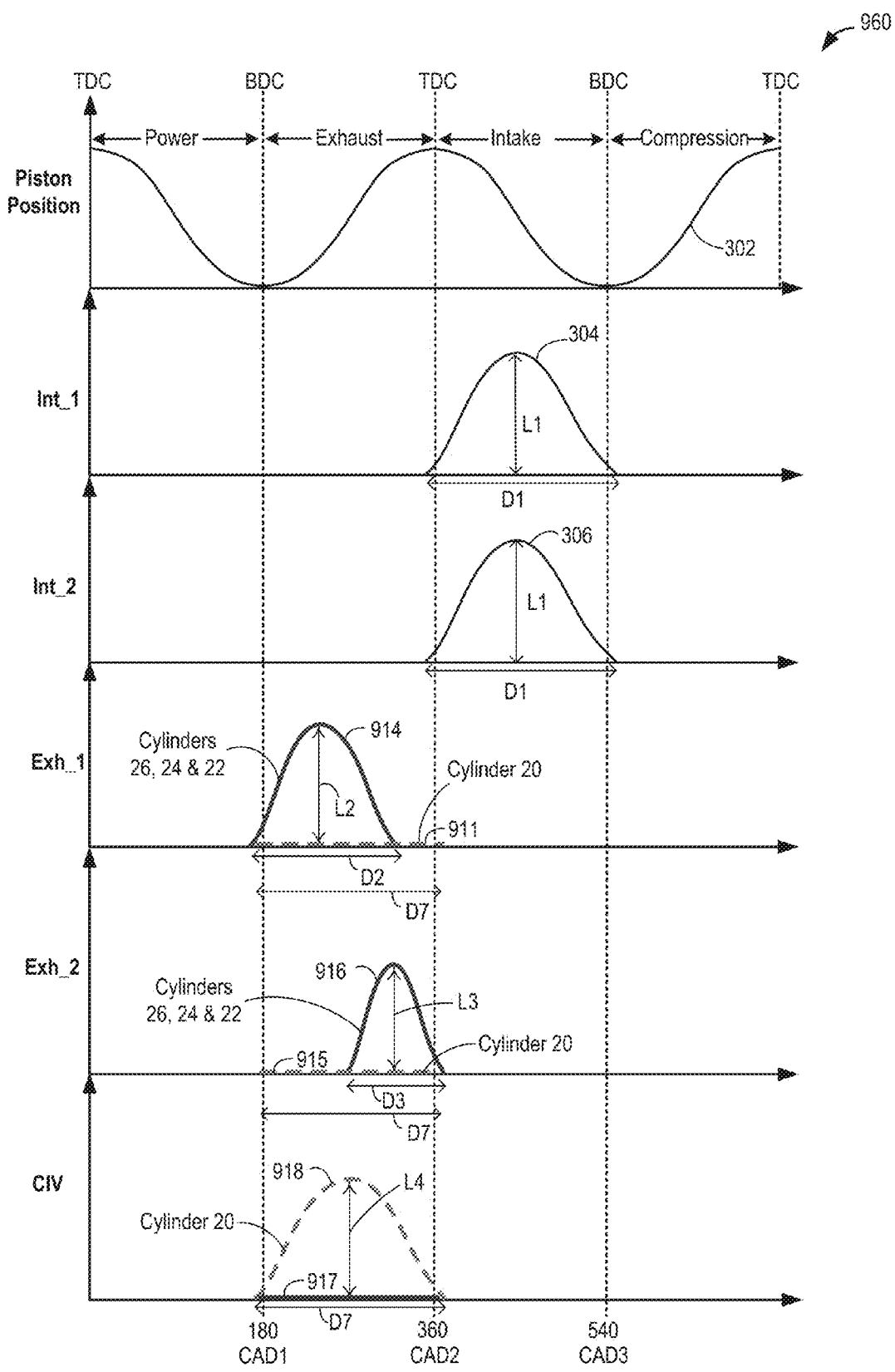
Figure 9C:
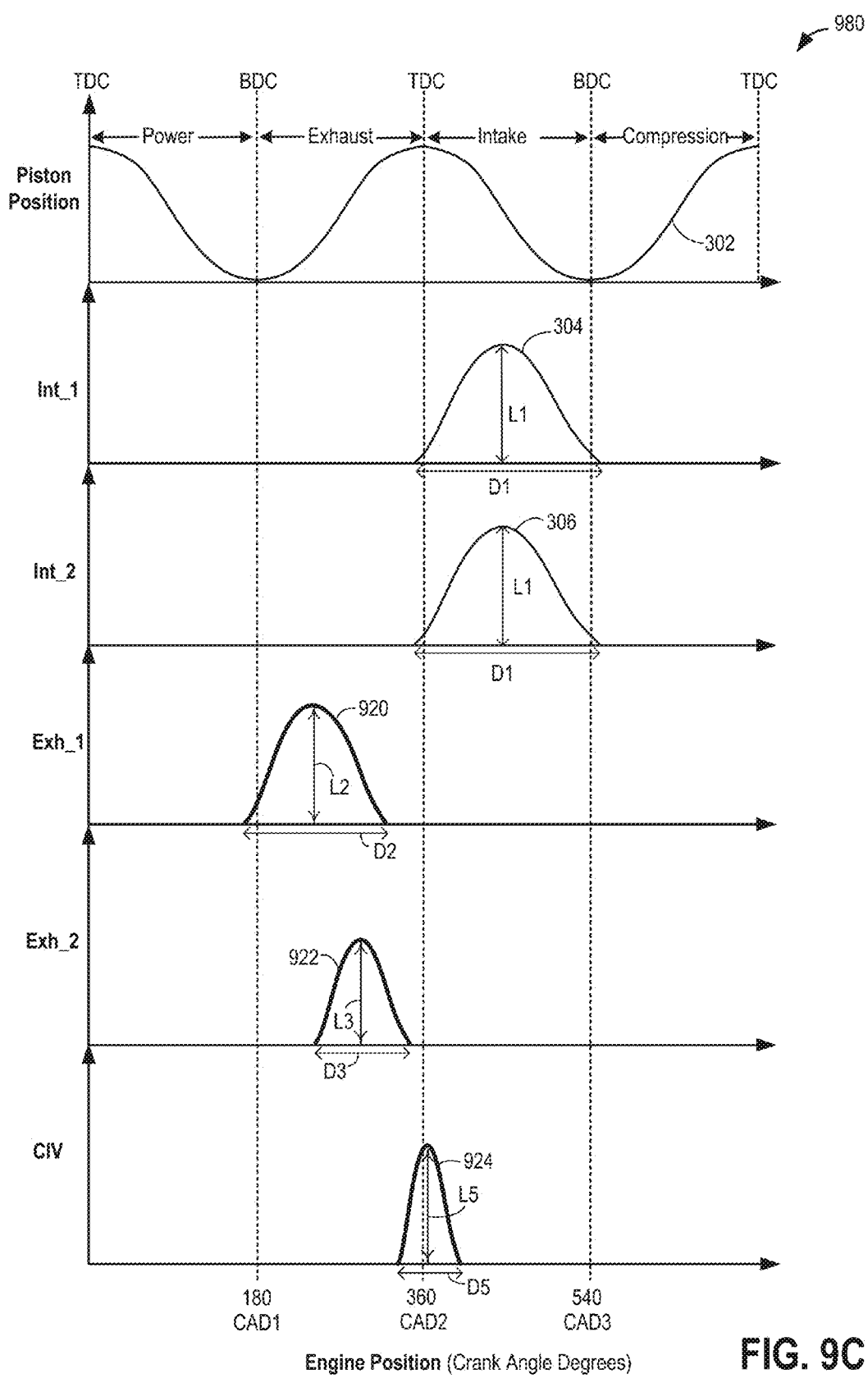
Figure 10:
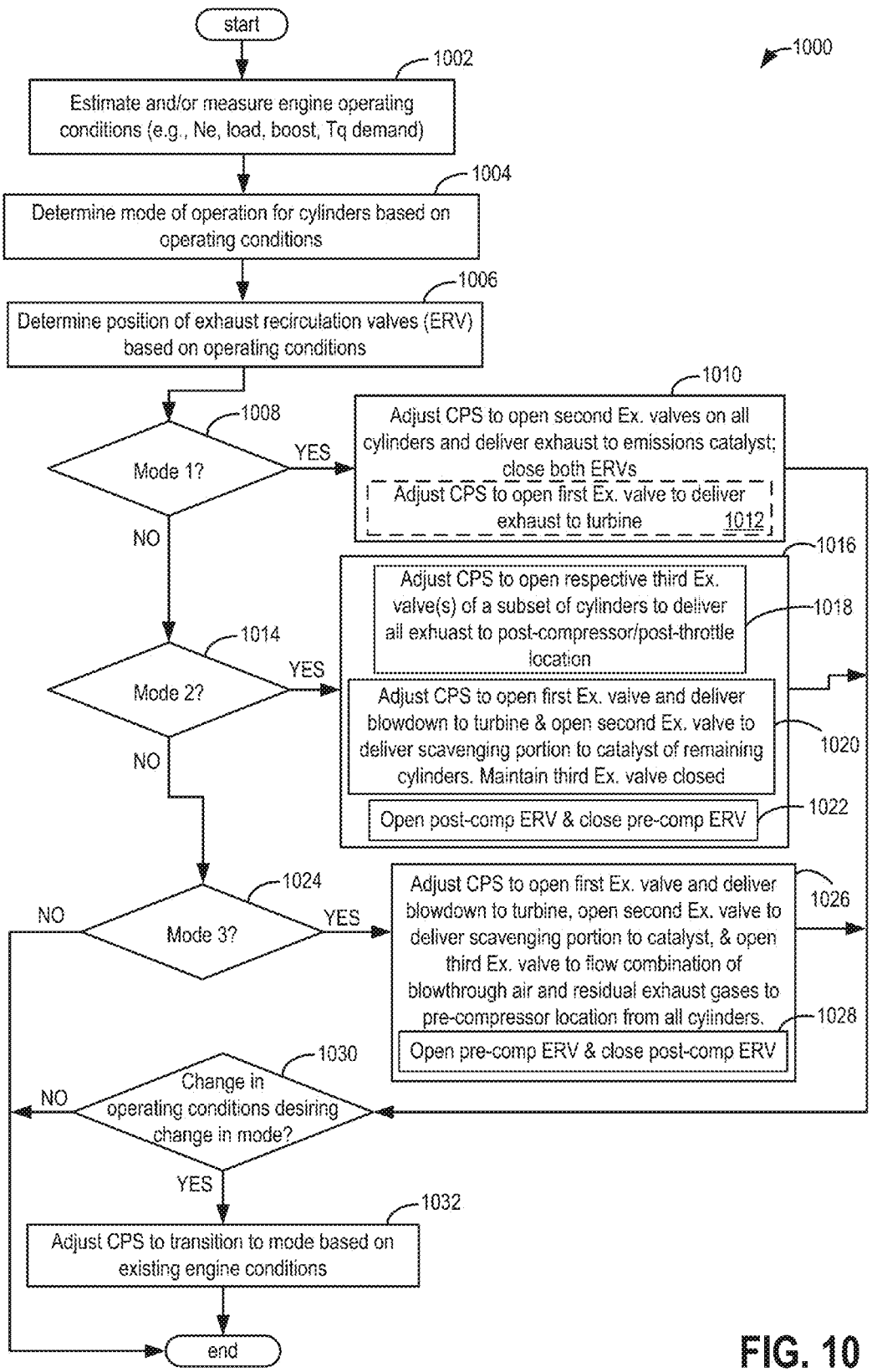
FIG. 10 is an example flow chart illustrating a routine for adjusting exhaust valves of a plurality of cylinders of the second embodiment of the turbocharged engine based on engine operating conditions.

Now turning to FIGS. 9A, 9B, and 9C, they include maps 940, 960, and 980 respectively which depict example valve timings with respect to a piston position, for one or more engine cylinders each comprising 5 valves: two intake valves, two exhaust valves and one compressor inlet valve, such as the cylinders described in FIGS. 1, 6, and 7. A CPS system, such as CPS system 704 may vary a timing of opening and closing of the 5 valves, as well varying a duration that the 5 valves are held open. The example maps in FIGS. 9A, 9B, and 9C may be similar to the example of FIG. 3 in that they depict valve timings relative to piston position and crankshaft rotation. Accordingly, maps 940, 960, and 980 retain similar numbering of FIG. 3 for the plot of piston position (curve 302) and intake valve timings (curves 304 and 306).

Each of maps 940, 960, and 980 illustrates an engine position along the x-axis in crank angle degrees (CAD). Curve 302 depicts piston positions (along the y-axis), with reference to their location from top dead center (TDC) and/or bottom dead center (BDC), and further with reference to their location within the four strokes (intake, compression, power and exhaust) of an engine cycle.

Curve 304 in each of maps 940, 960, and 980 depicts a first intake valve timing, lift, and duration for a first intake valve (Int_1) while curve 306 depicts a second intake valve timing, lift, and duration for a second intake valve (Int_2) coupled to the intake passage of the engine cylinder. In the depicted examples, the first and second intake valves are fully opened from a closed position at a common timing (curves 304 and 306), starting substantially closer to intake stroke TDC, just before CAD2 (e.g., at or just before intake stroke TDC) and are closed just after a subsequent compression stroke has commenced past CAD3 (e.g., at or just after BDC). Additionally, when opened fully the two intake valves may be opened with the same amount of valve lift L1 for the same duration of D1. In other examples, the two valves may be operated with a different timing by adjusting the phasing, lift or duration based on engine conditions.

It will be appreciated that each of the intake valves, each of the exhaust valves, and each of the compressor inlet valves are actuated independent of each other via the associated CPS and VCT systems.

Referring now to map 940 of FIG. 9A, it depicts example valve timings for all cylinders in engine 10 of FIGS. 6 and 7 when the engine is operating in region 808 of map 800. Specifically, map 940 includes example exhaust valve timings for engine operation during very low engine loads, e.g. 0-2 bar BMEP. As described in reference to FIG. 8, during engine operation under very low loads, compressor inlet valves of each of the plurality of cylinders may be held closed by actuating the compressor inlet valves via their respective null cams. Accordingly, curve 913 depicts that the CIV has no valve lift (e.g., zero valve lift) for duration D7 (e.g., from before BDC to just after TDC). In other words, CIVs of all cylinders are fully closed throughout the duration of the exhaust strokes when the engine is operating with very low or very light loads.

Further, the first exhaust valves (e.g., exhaust valves 128, 126, 124, and 122) may also be fully closed for the entire duration of the exhaust strokes when the engine is operating in region 808 of map 800. In other words, exhaust valves 128, 126, 124, and 122 may be actuated by their respective null cams and may be deactivated. Accordingly, curve 911 depicts that the first exhaust valves of all cylinders (Exh_1) has no valve lift (e.g., zero valve lift) for duration D7 (e.g., from before BDC to just after TDC).

Curve 912 depicts an example exhaust valve timing, lift, and duration for second exhaust valves (Exh_2) of the engine cylinders, the second exhaust valves coupled to second exhaust passage (e.g., pipe 162) and manifold 57. Second exhaust valves may include valves 138, 136, 134, and 132 communicating with manifold 57. As shown in map 940, when the engine is operating under considerably light loads, second exhaust valves may be fully opened (from fully closed) throughout the duration of the exhaust strokes (e.g., from before CAD1 to just after CAD2). Thus, second exhaust valves of the plurality of cylinders of engine 10 may be held open for duration D7, as depicted. Specifically, the second exhaust valves may be opened before the start of an exhaust stroke (for e.g., within 10 degrees before BDC of the power stroke), maintained fully open through the exhaust stroke duration, and may be fully closed (from open) just after the exhaust stroke ends (for e.g., within 10 degrees after TDC in the exhaust stroke).

Thus, all exhaust from all cylinders of engine 10 may be directed to the emissions catalyst when the engine is operating with very low engine loads. Herein, all exhaust may include blowdown portion, scavenging portion, as well as residual exhaust gases. For example, the second exhaust valves of cylinders 26, 24, and 22 may be actuated by their respective second exhaust cams 718. Likewise, exhaust valve 132 may be actuated by ninth exhaust cam 732. Further, each of the second exhaust valves may be opened with the second amount of valve lift L3. For example, second amount of valve lift L3 may be a maximum opening of the second exhaust valves.

It will be appreciated that positive valve overlap between the second exhaust valves and the corresponding intake valves may exist as the ensuing intake stroke commences after TDC at CAD2. Herein, exhaust gases towards the end of the exhaust stroke may be drawn in a reverse direction into intake manifold 27 from respective combustion chambers. Specifically, during very low engine loads, the intake manifold 27 may be at a lower pressure relative to pressures in the exhaust manifolds (e.g., manifold 57 and/or manifold 55). Accordingly, low pressure exhaust gases remaining in the cylinders at the end of the exhaust stroke may flow from the cylinders into intake manifold 27. This flow of exhaust gases from the combustion chambers into the intake manifold may be termed "reverse" flow contrary to "forward" flow wherein exhaust gases from the combustion chambers flow into the exhaust manifolds. Exhaust gases that have entered the intake manifold 27 in the reverse flow mode may later be blown into the engine cylinders along with fresh intake air via open intake valves in the subsequent intake strokes. As such, these low pressure exhaust gases flowing into the engine cylinders during an intake stroke may function as internal EGR. It will be noted that since the intake manifold is at reduced pressures compared to the exhaust manifold during very low engine loads, fresh blow-through intake air may not stream into the exhaust manifolds.

It will also be appreciated that by flowing all the exhaust to the emissions control device during low load operation (and by not diverting portions of the exhaust to either the turbine, the pre-compressor location, or the post-compressor location), such as during engine cold starts, the emission control device may attain light-off temperatures rapidly.

Optionally, when the exhaust catalyst has attained light-off temperature and the engine is operating under very low loads, a small portion of the blowdown pulse may be diverted via the first exhaust valves towards the turbine by opening first exhaust valves at the beginning of the exhaust strokes, as shown by dotted curve 908. Dotted curve 908 depicts an example valve timing, lift, and duration for the first exhaust valves to collect a part of the blowdown portion of the exhaust pulse. As shown, first exhaust valves of all cylinders may open with the first amount of valve lift L2 for a duration D6. Herein, the first exhaust valves may be opened (from closed) just before TDC or just before CAD1 and may be closed before the midpoint of the exhaust stroke between CAD1 and CAD2 (e.g., within 90 CAD of the exhaust stroke).

The second exhaust valves may be opened during the same exhaust stroke for the same valve timing, lift, and duration as shown by curve 912. Alternatively, the second exhaust valves may be opened for a shorter duration than D7 as shown by dotted curve 909. Dotted curve 909 depicts an example valve timing, lift, and duration for second exhaust valves to collect a remaining portion (e.g., portion of exhaust remaining in cylinder after first exhaust valve closes as shown by dotted curve 908) of the exhaust pulse. As shown in the example of dotted curve 909, the second exhaust valves may be opened from close just before the first exhaust valves close (e.g., between 45 CAD and 90 CAD of the exhaust stroke) and may remain open till just after TDC of the exhaust stroke (e.g., just after CAD2, about 10 CAD after CAD2). Further, the second exhaust valves may be open for a duration D8 wherein D8 is shorter than duration D7 of curve 912. Herein, the first exhaust valve(s) may be opened earlier in the engine cycle than the timing at which the second exhaust valve is opened from close.

In this way, when the engine is operating with very low loads, such as within region 808 of map 800, all of the exhaust in the exhaust strokes of each cylinder may exit the cylinders via second exhaust valves (e.g., valves 138, 136, 134, and 132) into manifold 57, and thereon towards emissions control device 72. Optionally, a small portion of the blowdown pulse in each cylinder may be directed via first exhaust valves (e.g., valves 128, 126, 124, and 122) through manifold 55 towards exhaust turbine 92. Herein, the remaining portion of the exhaust pulse may be streamed via the second exhaust valves into manifold 57, and thereon towards emissions control device 72.

Referring now to map 960 of FIG. 9B, it depicts example valve timings for all cylinders in engine 10 of FIGS. 6 and 7 when the engine is operating in region 806 of map 800. Specifically, map 960 includes example exhaust valve timings for engine operation during low to medium engine loads, e.g., 2-10 bar BMEP. As described in reference to FIG. 8, during engine operation under lower to medium loads, a subset of the plurality of cylinders of engine 10 may be operated distinctly from a remaining number of cylinders in the plurality of cylinders. Specifically, a number of cylinders that is less than the total number of plurality of cylinders may be operated in a different manner than a remaining number of cylinders of the plurality of cylinders.

In the depicted example of engine 10 of FIGS. 6 and 7, the subset of the plurality of cylinders includes cylinder 20, wherein the plurality of cylinders includes cylinders 20, 22, 24, and 26. Thus, the subset of cylinders, e.g., cylinder 20, is operated in a distinct manner relative to the remaining cylinders, e.g. cylinders 22, 24, and 26 when the engine is operating in region 806 of map 800. To elaborate, all the exhaust (including blowdown pulse, scavenging pulse, and a small amount of residual gases) from cylinder 20 is directed to a post-compressor location. At the same time, exhaust from the remaining cylinders is not directed to the post-compressor location. Instead, exhaust from the remaining cylinders is directed to each of the turbine and the emissions control device.

Dashed curve 918 presents an example exhaust valve timing, lift, and duration for a compressor inlet valve (CIV) of cylinder 20 alone. Herein, the CIV of cylinder 20 may be fully opened throughout the duration of the exhaust strokes (e.g., from before CAD1 to just after CAD2). As shown, CIV 112 of cylinder 20 may be open for a duration D7 in map 960. Specifically, the CIV of cylinder 20 may be opened (from closed) before the start of an exhaust stroke (for e.g., within 10 degrees before BDC of the power stroke), maintained fully open through the exhaust stroke duration, and may be fully closed (from open) just after the exhaust stroke ends (for e.g., within 10 degrees after TDC). As such, a small amount of positive overlap may occur between the CIV and the intake valves of cylinder 20 as the subsequent intake stroke begins. Thus, substantially all exhaust (e.g., at least 95% of all the exhaust) from cylinder 20 (e.g., a subset of the cylinders) of engine 10 may be directed to a location that is downstream of the compressor (also termed, post-compressor) when the engine is operating with low to medium loads. The location may also be downstream of the intake throttle, as shown in FIG. 6. Dashed grey curves 911 and 915 represent the first exhaust valve and the second exhaust valve respectively of cylinder 20. As shown by dashed grey curves 911 and 915, each of the first exhaust valve and the second exhaust valve of cylinder 20 may be maintained fully closed during the exhaust stroke (for durations D7). There may be no valve lifts for each of first exhaust valve 122 and second exhaust valve 132. As such, valves 122 and 132 may be actuated by their respective null cams.

Solid curve 914 of map 960 depicts an example valve timing, lift, and duration of first exhaust valves for the remaining cylinders, e.g., cylinders 22, 24, and 26. Further, solid curve 916 presents an example valve timing, lift, and duration of second exhaust valves for the remaining cylinders, e.g., cylinders 22, 24, and 26. Further still, solid line 917 represents an example valve timing, lift, and duration of the CIVs of the remaining cylinders, e.g., cylinders 22, 24, and 26. Specifically, the first exhaust valve(s) are opened from a closed position at a first timing (solid curve 914) that is earlier in the engine cycle than the timing (solid curve 916) at which the second exhaust valve is opened from close. Specifically, the first timing for the first exhaust valve occurs just before the power stroke BDC, immediately prior to CAD1 (e.g., at or just before power stroke BDC) while the timing for opening the second exhaust valve is retarded from power stroke BDC, e.g. after CAD1 but before CAD2. As shown, the second exhaust valves may open at or around the midpoint of the exhaust stroke (e.g., midway between CAD1 and CAD2). The first exhaust valves may be closed before the end of the exhaust stroke, e.g., before TDC, while the second exhaust valves are maintained open till just past TDC of the exhaust stroke (e.g., till just after CAD2). As an example, the first exhaust valves may close about 45 CAD before exhaust stroke TDC at CAD2. Further, the first exhaust valves of the remaining cylinders may be held open for a duration D2.

The second exhaust valves may overlap positively with the intake valves albeit for short durations. Since the engine is operating under low to medium load conditions, the intake manifold may be at a lower pressure relative to exhaust pressures in either exhaust manifold 55 or exhaust manifold 57. Consequently, internal EGR may be provided as low pressure exhaust gases towards the trailing end of an exhaust stroke are drawn into the intake manifold during the positive valve overlap. The same low pressure exhaust gases may later be streamed into the cylinders with fresh intake air, as internal EGR, during the ensuing intake stroke. Further still, fresh intake blowthrough air may not flow into the cylinders and therethrough into the exhaust manifold during the positive valve overlap as the exhaust manifolds are at a higher pressure than the intake manifold.

Further still, the second exhaust valves may be open for a duration D3 (as in FIG. 3) which includes a duration from at or around the midpoint of the exhaust stroke until just past the beginning of the ensuing intake stroke (e.g., from about halfway between CAD1 and CAD2 until just past CAD2).

The CIVs of the remaining cylinders may be closed throughout the duration of the exhaust stroke e.g. from CAD1 through CAD2 as shown by the flat line of curve 917.

Thus, exhaust from the remaining cylinders during engine operation with low to medium loads may be directed to both the turbine and the emissions catalyst. Specifically, a first portion of the exhaust may be delivered to the turbine while the second, remaining portion of the exhaust is directed to the emissions control device. In other words, the blowdown portion of the exhaust (at higher pressure) is targeted to the turbine delivering desired engine power while the scavenging portion of the exhaust at relatively lower pressure is delivered to the emissions catalyst. As such, the two portions of exhaust may be expelled separately and at different times within the same engine combustion cycle as depicted in map 960.

By closing the CIVs of the remaining cylinders, blowthrough of fresh air and flow of LP-EGR may not occur from the remaining cylinders. However, a higher proportion of exhaust may be recirculated for EGR by providing all exhaust from cylinder 20 (e.g., subset of cylinders) to the engine within the same engine cycle as exhaust from the remaining cylinders is directed to the turbine and the emissions catalyst. In this way, the subset of cylinders may provide rich EGR (e.g., by enriching the EGR from cylinder 20) that helps combustion stability and burn rates. Further, by directing exhaust from the subset of cylinders to the intake manifold (post-compressor), improved engine efficiency may be obtained during low to medium load operation by reducing pumping and heat losses.

Turning now to map 980 of FIG. 9C, it depicts example valve timings for all cylinders in engine 10 of FIGS. 6 and 7 when the engine is operating in region 804 of map 800. Specifically, map 980 includes example exhaust valve timings for engine operation during high engine loads, e.g., more than 10 bar BMEP. As described in reference to FIG. 8, during engine operation under high loads, a significant portion of the exhaust from all cylinders of the engine may be delivered to the turbine of the turbocharger to produce the desired higher torque demand. Further still, to reduce knocking, cooling of all combustion chambers may be enabled by providing blowthrough of fresh intake air via positive vale overlap.

As shown by curve 920 (similar to curve 308 of FIG. 3), the first exhaust valves of the plurality of cylinders (e.g., valves 122, 124, 126, and 128) may be fully opened from closed position at or before the start of an exhaust stroke (for e.g., within 10 degrees before BDC of power stroke), maintained fully open through a first part of the exhaust stroke and may be fully closed before the exhaust stroke ends (for e.g., within 45 degrees before TDC of exhaust stroke) to collect the blowdown portion of the exhaust pulse. The second exhaust valves (curve 922) of the plurality of cylinders may be fully opened from a closed position at about the midpoint of the exhaust stroke (for e.g., between 60 and 90 degrees past BDC of power stroke or CAD1), maintained open through a second portion of the exhaust stroke and may be fully closed before the exhaust stroke ends (for e.g., within 20 degrees before TDC of the exhaust stroke) to exhaust the scavenging portion of the exhaust.

The CIVs of the plurality of cylinders (curve 924) may be fully opened, from a closed position, towards the end of the exhaust stroke (for e.g., within 25 degrees before TDC of the exhaust stroke), may be maintained fully open at least until a subsequent intake stroke has commenced and may be fully closed well after exhaust stroke TDC (for e.g., within 30 degrees past TDC). The intake valves may be fully opened from close just before the exhaust stroke ends (for e.g., within 10 degrees before TDC), maintained open through the intake stroke and may be fully closed at or just past the onset of the compression stroke (for e.g., within 10 degrees past BDC of the intake stroke). Therefore, the CIVs and the intake valves, as shown in FIG. 9C, may have a positive overlap phase (for e.g., from within 10 degrees before TDC until 30 degrees past TDC) to allow blowthrough of fresh intake air with EGR to a pre-compressor location (e.g., into a compressor inlet).

Thus, during high engine loads, each cylinder of the engine may be exhausted via at least three distinct passages comprising a first exhaust passage through a first exhaust valve leading to an exhaust turbine inlet, a second passage through a second exhaust valve leading to an emission control device and a third passage from a compressor inlet valve to upstream of the turbo-compressor. As such, the three portions of exhaust may be expelled separately and at different times within the same engine combustion cycle as depicted in map 980.

Further, the first exhaust valves may be fully closed and maintained closed well before the CIVs are fully opened while the second exhaust valves may be fully closed just after the CIVs are opened. Further, the first and second exhaust valves may overlap with each other, the second exhaust valves and the CIVs may overlap minimally with each other but the first exhaust valves may not overlap with the CIVs.

Additionally, the first exhaust valves may be opened at a first timing with a first amount of valve lift L2 while the second exhaust valves may be opened with a second amount of valve lift L3 and the CIVs may be opened with a third amount of valve lift L5. Further still, the first exhaust valves may be opened at the first timing for a duration D2 while the second exhaust valve may be opened for a duration D3 and the CIV may be opened for a duration D5. It will be appreciated that in alternate embodiments, the two exhaust valves may have the same amount of valve lift and/or same duration of opening while opening at differently phased timings.

In this way, by adjusting valve timings, lifts, and durations, the engine may be operated with lower pumping losses and higher efficiency at different load conditions. During low to medium loads, rich EGR reduces combustion instabilities. During high engine loads, blowthrough and low pressure EGR may provide temperature reductions while improving turbocharger performance. Herein, by separating the various portions of the exhaust, engine performance may be enhanced while reducing knock.

Turning now to FIG. 10, an example routine 1000 is shown for adjusting exhaust valves and compressor inlet valves of a multi-cylinder engine based on engine operating conditions to vary a location of delivery of exhaust gases including EGR. The method allows exhaust to be delivered to the turbine and the exhaust catalyst as well as recirculated to each of a pre-compressor and a post-compressor location based on existing engine conditions. As such, routine 1000 will be described in relation to the engine system shown in FIGS. 6 and 7, but it should be understood that similar routines may be used with other systems without departing from the scope of this disclosure. Instructions for carrying out routine 1000 included herein may be executed by a controller, such as controller 12 of FIGS. 6 and 7, based on instructions stored on a memory of the controller and in conjunction with signals received from sensors of the engine system, such as the sensors described above with reference to FIG. 6. The controller may employ engine actuators of the engine system, such as the actuators of FIGS. 6 and 7 to adjust engine operation, according to the routines described below.

At 1002, routine 1000 includes estimating and/or measuring engine operating conditions such as engine speed, torque demand, engine load, boost, MAP, intake air flow, ambient conditions such as ambient pressure, temperature, humidity, exhaust catalyst temperature, etc. At 1004, a mode of cylinder operation, e.g., adjusting the first and second exhaust valves as well as the compressor inlet valves, is selected based on engine conditions. For example, engine operating loads may decide a mode of cylinder operation. Next, at 1006, a position of the first ERV (e.g., first ERV 125 of FIG. 6) and second ERV (e.g., second ERV 625 of FIG. 6) may be based on engine operating conditions, as will be described below.

At 1008, it may be determined if a first mode has been selected. In one example, the controller may operate the engine cylinders in the first mode responsive to one or more of very low engine loads and engine cold start conditions. If the first mode is confirmed, routine 1000 continues to 1010 to adjust the CPS device coupled to the exhaust valves of the engine cylinders to selectively open the second exhaust valves of all cylinders and deliver hot exhaust gases to the emissions control device. Specifically, the controller may send a signal to the CPS system which in turn may communicate with the actuator systems operatively coupled to the exhaust camshaft. The exhaust camshaft may be shifted to select a specific combination of cam lobes for operating the exhaust valves of the cylinders.

The controller may operate the engine cylinders in a first mode with the second exhaust valves open and each of the first exhaust valves and compressor inlet valves (also termed, third exhaust valves) closed to direct all exhaust to the catalyst. Accordingly, each of the first ERV and the second ERV may be maintained fully closed. Herein, the controller may communicate a signal to an electromechanical actuator coupled to a corresponding ERV. Further, the electromechanical actuator of each respective ERV may hold each ERV at its fully closed position. Therefore, exhaust may not be delivered to either the pre-compressor locations (e.g. at inlet of compressor 94 via pipe 164) or the post-compressor location (e.g., at mixer 626 via post-compressor conduit 664).

Optionally, at 1012, the CPS system may adjust the first exhaust valve to open for a short duration (as shown by dotted curve 908 in FIG. 9A) during the beginning of the exhaust strokes to direct a small portion of exhaust to the turbine while the remainder exhaust is delivered to the emissions control device via the second exhaust valves (as shown by dotted curve 909 in FIG. 9A). This option may be utilized when the catalyst has attained light-off temperatures. Routine 1000 then proceeds to 1030 which will be described further below.

If at 1008, it is determined that the first mode is not selected, routine 1000 continues to 1014 where it determines if a second mode has been selected. In one example, the controller may operate the cylinders in the second mode responsive to engine operation at low to medium loads, such as in region 806 of map 800. If the second mode is confirmed, routine 1000 progresses to 1016 where multiple actions may be actuated simultaneously.

At 1018, a subset of the plurality of engine cylinders may be operated in a distinct manner relative to the remaining of the plurality of engine cylinders. Herein, the subset of cylinders is operated such that all exhaust from the subset of cylinders is directed to the post-compressor location, downstream of the intake throttle within a given engine cycle. Accordingly, at 1018, the CPS system may switch cam lobes coupled to the subset of cylinders, e.g., cylinder 20 in engine 10, to actuate the compressor inlet valve(s) of the subset of cylinders to open fully throughout the duration of exhaust strokes. At the same time and within the same given engine cycle, the first exhaust valves and the second exhaust valves of the subset of cylinders are maintained fully closed throughout the exhaust strokes. Next, at 1020, the CPS concurrently adjusts the first exhaust valves of the remaining cylinders to open during the first portion of the exhaust strokes to deliver the blowdown pulses of the exhaust strokes to the turbine of the turbocharger within the same given engine cycle. Further, the second exhaust valves are opened within the same engine cycle about halfway through the exhaust strokes to direct the scavenging portions of the exhaust strokes to the exhaust catalyst. Further still, the CPS system maintains the compressor inlet valves of the remaining cylinders at fully closed. As such, all the adjustments described above for the remaining cylinders may occur within the same exhaust stroke in the given engine cycle.

At 1022, the second ERV 625 (also termed, post-compressor ERV) is adjusted to fully open allowing the exhaust from cylinder 20 to flow into intake manifold via mixer 626. Specifically, the compressor may command a signal to the electromechanical (or hydraulic, etc.) actuator coupled to the second ERV 625 to adjust the second ERV to a fully open position. Further, first ERV 125 (also termed, pre-compressor ERV) may be maintained at fully closed to block the flow of any exhaust to the pre-compressor location. Routine 1000 then proceeds to 1030.

Returning to 1014, if the second mode is not selected, routine 1000 continues to 1024 to determine if a third mode of cylinder operation has been selected. In one example, the controller may operate the cylinders in the third mode responsive to engine operation at high engine loads, such as in region 804 of map 800. If the third mode of cylinder operation is confirmed, routine 1000 proceeds to 1026 wherein all cylinders are operated to deliver a first portion of exhaust to the turbine, a second portion of exhaust to the catalyst, and residual exhaust gases along with blowthrough fresh air to the compressor inlet (within the same combustion cycle).

At 1026, the CPS system may adjust the cam lobes to actuate the first exhaust valves of all cylinders to open during a first (initial) duration of the exhaust strokes (curve 920 of FIG. 9C) to convey the blowdown pulse to the exhaust turbine. Specifically, the first exhaust valves may be opened just as an exhaust stroke within a corresponding cylinder commences and closed well before the end of the exhaust stroke. The second exhaust valves may be opened about midway through the exhaust stroke in the corresponding cylinder and closed before the end of the exhaust stroke to channel the scavenged portion of the exhaust to the emission control device. Further still, the CIVs may be activated to open towards the end of the exhaust stroke in the corresponding cylinder and close well after the commencement of the intake stroke following the exhaust stroke to allow low pressure EGR and blowthrough air to be transferred to the compressor inlet.

As such, combusted gases from exhaust strokes within each cylinder of the engine during a common engine cycle may be split up into three portions as described above. Specifically, first portions of each exhaust stroke (e.g., blowdown portions) from each cylinder during the common engine cycle may be delivered to the exhaust turbine, second portions of each exhaust stroke (e.g., scavenged portions)

from each cylinder during the common engine cycle may be directed to the exhaust catalyst. Furthermore, residual exhaust gases in a clearance volume of the plurality of cylinders along with blowthrough air from a third portion of each exhaust stroke (and initial durations of following intake strokes) from each cylinder during the common engine cycle may be recirculated to upstream of the compressor within the same common engine cycle.

At 1028, the pre-compressor ERV may also be opened to allow the transfer of low pressure EGR and fresh blowthrough air to the intake passage upstream of the compressor. Specifically, the electromechanical actuator coupled to the first ERV may actuate the first ERV to a fully open position based on a signal from the compressor when the cylinders are being operated in the third mode. However, post-compressor ERV may be maintained at fully closed to block any EGR and blowthrough air entering the post-compressor location.

Routine 1000 then proceeds to 1030 to determine if there is a change in operating conditions which may cause a change in operating mode of the cylinders. If yes, routine 1000 continues to 1032 to adjust the CPS system to make desired changes to cylinder operation for operating in the desired mode based on existing engine conditions. For example, if the engine was originally operating with high engine loads and is now transitioning to operate with medium engine loads, cylinder operation may be transitioned from the third mode to the second mode. In response to this change in mode of cylinder operation, the CPS system may switch the cam lobes to allow the subset of cylinders to deliver all exhaust to the post-compressor location while the remaining cylinders supply their exhaust to the turbine as well as the emissions catalyst. In another example, engine operation may transition from operating at idle (e.g. very low loads) to a high load. In response to this shift, the controller may transition operation of engine cylinders from the first mode to the third mode. Routine 1000 then ends. If at 1030 it is instead determined that there is no change in engine operating conditions, routine 1000 ends.

Thus, an example method for an engine may comprise during a first condition, recirculating a combination of residual exhaust gases and blowthrough air from a plurality of cylinders of the engine to upstream of a compressor in a first engine cycle, and during a second condition, recirculating all exhaust from only a subset of the plurality of cylinders to downstream of the compressor and delivering exhaust gases from remaining cylinders to an exhaust turbine in a second engine cycle. The first condition may include high engine load conditions and the second condition includes medium engine load conditions. The second condition may also include low engine loads. As an example, the second condition may include region 806 of map 800, while the first condition may include region 804 of map 800 of FIG. 8. The method may further comprise during the first condition, delivering a first blowdown portion of exhaust gases to an exhaust turbine, and delivering a second scavenging portion of exhaust gases to an emission control device from the plurality of cylinders. Herein, the first blowdown portion of exhaust gases may be delivered to the exhaust turbine via a first exhaust valve of each of the plurality of cylinders, and the second scavenging portion of exhaust gases may be delivered to the emission control device via a second exhaust valve of each of the plurality of cylinders. The combination of residual exhaust gases and blowthrough air may be delivered to a location upstream of the compressor via a third exhaust valve of each of the plurality of cylinders. The method may also comprise during the second condition, delivering a first blowdown portion of exhaust gases to an exhaust turbine, and delivering a second scavenging portion of exhaust gases to an emission control device from the remaining cylinders.

Figure 11:
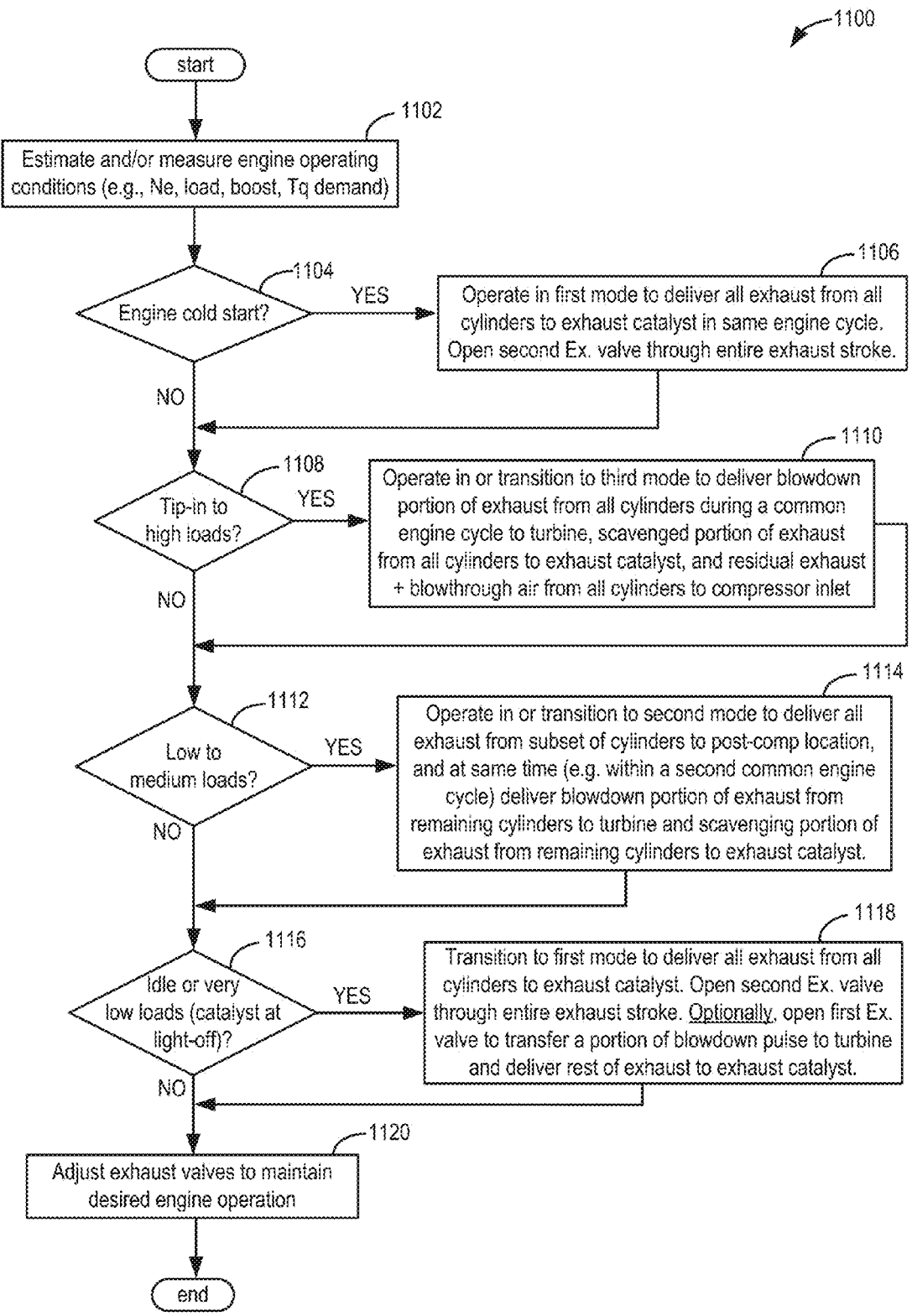
FIG. 11 presents an example flow chart depicting a routine for transitioning between different operating modes of the plurality of cylinders of the second embodiment of the turbocharged engine responsive to changes in engine operating conditions.

FIG. 11 presents an example routine 1100 for selecting an operating mode and transitioning between operating modes of the cylinders of the multi-cylinder engine responsive to engine operating conditions. As such, routine 1100 will be described in relation to the engine system shown in FIGS. 6 and 7, but it should be understood that similar routines may be used with other systems without departing from the scope of this disclosure. Instructions for carrying out routine 1100 included herein may be executed by a controller, such as controller 12 of FIGS. 6 and 7, based on instructions stored on a memory of the controller and in conjunction with signals received from sensors of the engine system, such as the sensors described above with reference to FIG. 6 (and FIG. 1). The controller may employ engine actuators of the engine system, such as the actuators of FIGS. 6 and 7 to adjust engine operation, according to the routines described below.

At 1102, as at 1002 of routine 1000, engine operating conditions are estimated and/or measured. At 1104, routine 1100 determines if an engine cold start condition is present. In one example, an engine cold start may be confirmed if an exhaust catalyst temperature is lower than a threshold, such as lower than a light-off temperature. In another example, an engine cold start may be confirmed if engine temperature is lower than a threshold temperature. As such, engine loads during an engine cold start may be very low.

If an engine cold start condition is confirmed, routine 1100 proceeds to 1106 to operate the cylinders of the engine in the first mode with the second exhaust valves of all cylinders of the engine at fully open to deliver all exhaust to the exhaust catalyst, while bypassing the exhaust turbine. Further, exhaust recirculation may not occur during first mode operation. Herein, each of the first exhaust valves and the third exhaust valves (or CIVs) may be concurrently closed during the exhaust strokes. As such, the second exhaust valves of all cylinders may open for the entire duration of the exhaust stroke while the first exhaust valves and the CIVs of all cylinders are fully closed through the entire duration of the exhaust strokes. Specifically, all exhaust from all cylinders of the engine during a common engine cycle may be guided to the emissions control device.

Routine 1100 then continues to 1108. As such, if the engine cold start is not confirmed at 1104, routine 1100 proceeds to 1108 wherein it is confirmed if a tip-in event to a higher load is occurring. For example, there may be a sudden increase in torque demand indicating the tip-in where the torque request increases beyond a threshold and a boost pressure above a threshold is commanded. As such, the engine may now be operating with high loads. Further, a rapid spool-up of the turbine of the turbocharger may be desired. In another example, the engine may be operating under high loads if the vehicle is travelling up an incline. If the tip-in event to higher engine loads is not determined, routine 1100 continues to 1112. However, if high engine load conditions are confirmed at 1108 (e.g., during the tip-in event), routine 1100 continues to 1110 to operate (or transition) the cylinders of the engine in the third mode.

Operation in the third mode includes delivering blowdown portions of exhaust from all cylinders during a common engine cycle to the exhaust turbine enabling rapid spool-up of the turbocharger. Further, scavenged portions of exhaust from all cylinders is guided to the exhaust catalyst within the common engine cycle. Further still, a combination of residual exhaust gases in the clearance volume of all cylinders and fresh blowthrough intake air is delivered towards the end of the exhaust strokes and beginning of following intake strokes in the common engine cycle to the compressor inlet via the first ERV. Thus, the third mode includes opening the first exhaust valve, the second exhaust valve, and the CIV of each of the plurality of cylinders during at least a portion of each exhaust stroke. Further still, the first ERV is opened during the third mode to stream residual exhaust gases and fresh blowthrough air into the compressor inlet. The second ERV may be closed during the third mode.

Routine 1100 then proceeds to 1112 to determine if engine conditions have changed to those with low to medium engine loads. For example, the vehicle may now be cruising at steady speeds. If yes, routine 1100 progresses to 1114 to transition and/or operate the cylinders of the engine in the second mode. Accordingly, all exhaust from a subset of the plurality of cylinders, e.g., cylinder 20 of engine 10 in FIGS. 6 and 7, is recirculated to a location downstream of the compressor (and downstream of the intake throttle) and upstream of the intake manifold. As such, the second ERV may be opened to allow the exhaust gases from the subset of cylinders to flow to the post-compressor location while the first ERV is held fully closed. Simultaneously, within the same engine cycle wherein exhaust from the subset of the plurality of cylinders is delivered as EGR to the intake manifold, exhaust from the remaining of the plurality of the cylinders is conducted to each of the exhaust turbine and the exhaust catalyst. In this way, sufficient high pressure exhaust gases spin the turbine of the turbocharger providing desired torque while engine efficiency is enhanced by delivering rich exhaust to the intake manifold. Routine 1100 continues to 1116.

If it is determined at 1112 that engine conditions are not at low to medium loads, routine 1100 proceeds to 1116 to determine if the engine is idling or engine is operating again at very low loads albeit with the exhaust catalyst at or higher than light-off temperature. As such, the engine may be operating under very low loads with the emissions control device adequately warmed-up. If yes, routine 1100 moves to 1118 to transition operation of cylinders of the engine to the first mode. Specifically, all exhaust from all cylinders may be delivered to the exhaust catalyst by adjusting the second exhaust valves of all cylinders to open for the complete duration of the respective exhaust strokes within a common engine cycle. At the same time within the common engine cycle, the first exhaust valves and CIVs of all cylinders may be held closed for the entire duration of the exhaust strokes. Optionally, the first exhaust valves of all cylinders may open during a first initial duration of the respective exhaust strokes to transfer a portion of blowdown pulse to the exhaust turbine. Further, during the same respective exhaust strokes, the second exhaust valves may be opened during the remaining portion of the respective exhaust strokes to deliver residual exhaust to the emission control device. Routine 1100 then progresses to 1120 to adjust exhaust valves and CIVs of each cylinder to maintain the desired (e.g., existing) engine operation, and then ends.

Thus, an example system may comprise an engine having an intake manifold and an exhaust manifold, the exhaust manifold fluidically coupled to an emissions control device, an intake throttle in an intake passage coupled upstream of the intake manifold, a turbocharger including an intake compressor driven by an exhaust turbine, a plurality of cylinders each including a first exhaust valve, a second exhaust valve, and a third exhaust valve (also termed, a compressor inlet valve), a first exhaust passage fluidically coupling the first exhaust valve directly to only a turbine of the turbocharger, a second exhaust passage fluidically coupling the second exhaust valve directly to only an emissions control device, a third passage (e.g., pipe 164 of FIG. 6) fluidically coupling the third exhaust valve directly to only an inlet of the intake compressor, a fourth passage (e.g., post-compressor conduit 664 of FIG. 6) fluidically coupling the third exhaust valve to the intake passage downstream of the intake compressor, downstream of the intake throttle and upstream of the intake manifold, a first exhaust recirculation valve (e.g., valve 125 of FIG. 6) positioned within the third passage, a second exhaust recirculation valve (e.g., second ERV 625 of FIG. 6) positioned within the fourth passage, and a cam profile switching system coupled to each of the first exhaust valve, the second exhaust valve, and the third exhaust valve of each of the plurality of cylinders.

The system may also include a controller with computer readable instructions stored in non-transitory memory for operating the plurality of cylinders in a first mode with the second exhaust valve open and each of the first exhaust valve and the third exhaust valve closed to recirculate all exhaust to the emissions control device, operating the plurality of cylinders in a second mode wherein a subset of the plurality of cylinders (e.g., cylinder 20 of engine 10 in FIGS. 6 and 7) is operated with the third exhaust valve open and each of the first exhaust valve and the second exhaust valve closed to recirculate all exhaust to the intake manifold, downstream of the intake compressor and remaining of the plurality of cylinders (e.g., cylinders 22, 24, and 26 of engine 10) are operated with each of the first exhaust valve and the second exhaust valve open and the third exhaust valve closed to deliver portions of exhaust to the exhaust turbine and the emissions control device, and operating the plurality of cylinders in a third mode with each of the first exhaust valve, second exhaust valve, and the third exhaust valve open to divert portions of exhaust to each of the inlet of the intake compressor, the emissions control device, and the exhaust turbine. The controller may include further instructions for closing each of the first exhaust recirculation valve and the second exhaust recirculation valve when the plurality of cylinders is operating in the first mode, closing the first exhaust recirculation valve and opening the second exhaust recirculation valve when the plurality of cylinders is operating in the second mode, and opening the first exhaust recirculation valve and closing the second exhaust recirculation valve when the plurality of cylinders is operating in the third mode.

Referring now to FIG. 12, it depicts a table 1200 depicting example valve status and/or valve timings for each of the exhaust valves and the CIVs of the plurality of cylinders, and the ERVs based on the operating mode of the plurality of cylinders of engine 10 of FIGS. 6 and 7. Table 1200 also indicates a target location of portions of exhaust during the different modes of cylinder operation. As mentioned earlier, table 1200 will be described in reference to engine 10 of FIGS. 6 and 7. Further, the status of the exhaust valves, the ERVs, and the CIVs is illustrated for a common engine cycle within each distinct mode of operation.

It will be noted that cylinder 20 is listed separately from cylinders 22, 24, and 26. As such, cylinder 20 may be the subset of the plurality of cylinders 20, 22, 24, and 26 of engine 10. Further, cylinders 22, 24, and 26 may be the remaining cylinders of the plurality of cylinders. In alternative embodiments including engines with a higher number of cylinders, e.g., 6, 8, 10 cylinders, the subset of cylinders may include more than one cylinder.

During the first mode of operation (e.g., Mode 1), which occurs during very low engine loads, the first exhaust valves (Exh_1) and the CIVs (Exh_3) of each cylinder are held closed through the entire exhaust stroke within the same common engine cycle. Specifically, Exh_1 and Exh_3 of cylinders 20, 22, 24, 26 are closed during first mode of operation. During the same common engine cycle, the second exhaust valves (Exh_2) of all cylinders of engine 10 is opened for the entire duration of the exhaust strokes. To elaborate, Exh_2 for cylinders 20, 22, 24, and 26 is opened (from closed position) just before BDC position of the corresponding piston towards the end of a power stroke, maintained open as the piston rises to the TDC of the succeeding exhaust stroke, and closed just after attaining TDC position of the exhaust stroke. Further, there may be a small degree of positive overlap between the second exhaust valve and the intake valves in the following intake stroke allowing internal EGR. In alternative embodiments, positive valve overlap may not occur.

The first mode of operation during very low engine loads may additionally or optionally include opening the first exhaust valves (from closed position) of each cylinder just before TDC position of the corresponding piston at the end of the power stroke (as depicted in dotted curve 908 of FIG. 9A). This optional mode of operation may be employed during very low engine loads after the emission control device has attained light-off temperature, for example. The first exhaust valves may be held open till about halfway through the exhaust stroke (e.g., 90 CAD after BDC in exhaust stroke) and may be closed at about midpoint of the exhaust stroke. Thus, a first portion of the exhaust pulse may be delivered to the exhaust turbine. Further, the second exhaust valves of each cylinder may be opened (from closed) to deliver remaining exhaust to the emission control device. In one example, the second exhaust valves may be held open for the entire duration of the exhaust stroke (e.g., from BDC to TDC of exhaust stroke). Herein, the second exhaust valves may overlap with the first exhaust valves from BDC to midpoint of the exhaust stroke. In another example (as shown in dotted curve 909 of FIG. 9A), the second exhaust valves may be opened just before the first exhaust valves are closed. Specifically, the second exhaust valves may be opened just before the midpoint of the exhaust stroke and may be closed just after the exhaust stroke ends (e.g., just after TDC position of the corresponding piston at the end of the exhaust stroke).

During the first mode of operation, each of the first ERV (or the pre-compressor ERV) and the second ERV (or post-compressor ERV) is held closed. Further, during the first mode of operation, the entire exhaust from all the cylinders of the engine is directed to the emissions control device. In some embodiments, the first mode of operation may additionally include delivering a small portion of the blowdown pulse of the exhaust to the turbine of the turbocharger. Herein, the first exhaust valves of each cylinder (e.g., cylinders 20, 22, 24, and 26) may be opened for during an initial part of the exhaust stroke while the second exhaust valves are opened for the remaining duration of the same exhaust stroke.

During the second mode of operation (e.g., Mode 2), which occurs when the engine is operating with low to medium loads, Exh_3 in cylinders 22, 24, and 26 is maintained closed during the entire duration of the respective exhaust stroke within a given engine cycle. However, the first exhaust valves in cylinders 22, 24, and 26 are opened (from close), in the given engine cycle, just before BDC position of the respective piston towards the end of the power stroke and are maintained open as the piston rises to the TDC of the succeeding exhaust stroke. Finally, the first exhaust valves are closed (from open) well before TDC position (e.g., around 45 CAD before TDC) of the respective pistons in the exhaust stroke within the same given engine cycle. Meanwhile, the second exhaust valves (Exh_2) of cylinders 22, 24, and 26 are opened from closed in the same given cycle as the corresponding first exhaust valves in the respective cylinders are at their maximum lift around the mid-point of the respective exhaust strokes. Further, the second exhaust valves of cylinders 22, 24, and 26 are closed within the same given engine cycle just after TDC of the respective exhaust strokes.

During the second mode of operation, cylinder 20 is operated in a distinct manner relative to the operation of remaining cylinders 22, 24, and 26. The first exhaust valve and the second exhaust valve of cylinder 20 are held closed for the entire duration of the exhaust strokes in the same given engine cycle. Further, the third exhaust valve of cylinder 20 is maintained open for the entire duration of the respective exhaust strokes in the same given engine cycle. Specifically, the CIV of cylinder 20 is opened (from closed) just before BDC position of the corresponding piston towards the end of a power stroke, maintained open as the piston rises to the TDC of the succeeding exhaust stroke, and closed just after attaining TDC position of the exhaust stroke. Further, positive overlap between the CIV and the intake valves of cylinder 20 in the following intake stroke may be present. Alternatively, positive valve overlap may not occur.

Further still, the second ERV (or post-compressor ERV) may be open during the second mode of operation for recirculating entire exhaust contents from cylinder 20 (e.g., the subset of cylinders) to the post-compressor location via post-compressor conduit 664. Furthermore, the first ERV (or pre-compressor ERV) may be maintained closed. During the second mode of operation, all the exhaust from cylinder 20 may be recirculated downstream of the compressor at a location that is immediately upstream of the intake manifold and downstream of the intake throttle. Accordingly, exhaust from cylinder 20 may not be supplied to the turbine, the pre-compressor location (as first ERV is closed), or the emissions catalyst during the second mode. During the same given engine cycle, exhaust from the remaining cylinders (e.g., cylinders 22, 24, and 26) is directed to each of the turbine and the emissions control device. Specifically, a first portion of exhaust including the blowdown pulse at higher pressures may be directed to the turbine while a second portion of the exhaust including the scavenged portion of the exhaust may be conducted to the emissions control device. Thus, exhaust from the remaining cylinders may not be supplied to either the compressor inlet or the post-compressor location as the third exhaust valves of the remaining cylinders are maintained closed for the entire duration of the exhaust strokes during the second mode of operation.

During the third mode of operation (e.g., Mode 3), which occurs during high engine loads, each of the first exhaust valves, the second exhaust valves, and the CIVs of each cylinder may be opened for specific durations and portions of the respective exhaust strokes within a distinct common engine cycle. The first exhaust valves in all cylinders of engine 10 may be opened from close just before BDC positions of the respective pistons towards the end of the power stroke and are maintained open as the piston rises to the TDC of the succeeding exhaust stroke. Finally, the first exhaust valves are closed (from open) well before TDC positions (e.g., around 45 CAD before TDC) of the respective pistons in the exhaust stroke within the distinct common engine cycle.

In the distinct common engine cycle, the second exhaust valves of all cylinders of engine 10 are opened from closed status as the corresponding first exhaust valves in the respective cylinders are at their maximum lift around the mid-point of the respective exhaust strokes. Further, the second exhaust valves of all cylinders are closed within the distinct common engine cycle before TDC (e.g. within 20 degrees of TDC) of the respective exhaust strokes. Finally, the CIVs of all cylinders may open (from close) just before TDC position of the respective pistons in the exhaust stroke, and may be held open until about 30 degrees after TDC in the subsequent intake stroke. Specifically, the CIVs may be closed well after TDC position of the respective pistons enabling positive valve overlap between the respective CIVs and the intake valves within the same cylinders. Intake manifold 27 may be at a higher pressure than the exhaust manifold 59 when the engine is operating under heavy loads. Herein, fresh intake blowthrough air may be forced into the cylinders and then through the open CIVs. It will be appreciated that internal EGR due to reverse flow of low pressure exhaust gases into the intake manifold (as described earlier when the intake manifold is at lower pressure than the exhaust pressure in the exhaust manifolds) at the end of the exhaust stroke may not occur.

Furthermore, the first ERV may be opened during the third mode of operation to allow flow of exhaust residuals along with fresh blowthrough air from all the cylinders towards the compressor inlet. Accordingly, during the third mode of operation, a first blowdown portion of exhaust is delivered to the turbine, a second, scavenging portion of exhaust is supplied to the emissions catalyst, and a combination of blowthrough air and low pressure EGR is recirculated to the pre-compressor location via pipe 164 and first ERV 125.

It will be appreciated that exhaust from cylinders 22, 24, and 26 may not be supplied to the post-compressor location during any of the modes of operation. As such, exhaust only from the subset of cylinders, e.g., cylinder 20, is supplied to the post-compressor location during the second mode of operation.

In this manner, an example method for an engine may comprise directing exhaust from a first cylinder group (e.g., cylinder 20 of engine 10) to one or more of a pre-compressor location, a post-compressor location, and an exhaust turbine, and directing exhaust from a second cylinder group (e.g., cylinders 22, 24, and 26 of engine 10) to one or more of the pre-compressor location, and the exhaust turbine. The first cylinder group and the second cylinder group may be mutually exclusive and comprise distinct cylinders. For example, the first cylinder group in reference to engine 10 of FIG. 6 may include cylinder 20 while the second cylinder group may comprise cylinders 22, 24, and 26. Thus, each cylinder group may have distinct and separate cylinders wherein cylinders included in the first cylinder group are not part of the second cylinder group. As such, exhaust from the first cylinder group may be directed to the post-compressor location during medium engine load conditions. The method may further comprise not directing exhaust from the first cylinder group to either the pre-compressor location or the exhaust turbine during medium load conditions. Exhaust from the second cylinder group may be directed to the exhaust turbine and not directed to the pre-compressor location during medium loads. Herein, the post-compressor location may include a location downstream of an intake throttle and upstream of an intake manifold.

It will be noted that exhaust from the first cylinder group may be directed to each of the pre-compressor location and the exhaust turbine during high engine load conditions, and at the same time in a common engine cycle, exhaust from the second cylinder group is directed to each of the pre-compressor location and the exhaust turbine during the high engine load conditions. Directing exhaust to the pre-compressor location may include directing a combination of blowthrough intake air and residual exhaust gases to upstream of a compressor towards an end of an exhaust stroke in each of the first cylinder group and the second cylinder group. Further, directing the combination of blowthrough intake air and residual exhaust gases towards the end of the exhaust stroke in each of the first cylinder group and the second cylinder group may also include providing a positive valve overlap between at least one intake valve and one corresponding exhaust valve of each cylinder in each of the first cylinder group and the second cylinder group. The method may also comprise not directing exhaust from either the first cylinder group or the second cylinder group to the post-compressor location during high engine load conditions. As such, directing exhaust may include selectively opening one or more exhaust valves of each of the first cylinder group and the second cylinder group, and wherein selectively opening includes actuating a cam profile switching device including cam lobes coupled to each of the one or more exhaust valves to vary a timing of opening and a duration of opening of each of the one or more exhaust valves.

In this way, an engine with a split exhaust manifold may be operated with enhanced efficiency and reduced knock. By modifying exhaust valve operation to direct exhaust to different locations based on engine conditions, a larger amount of EGR may be supplied to the engine when the engine has a lower torque demand. When the engine is operating with higher torque demand, blowthrough air along with low pressure EGR may be used for reducing combustion temperatures, thereby, alleviating knock. Overall, engine performance may be enhanced.

While the above examples may include two exhaust valves per cylinder and a third compressor inlet valve to drain exhaust gases from the cylinder, another representation may include systems with exactly one exhaust valve and one compressor inlet valve (CIV) per cylinder, at least for some cylinders and potentially all cylinders. The CIV may be termed a "second exhaust valve" in this representation. This configuration may use the various methods and components described above herein, with the exhaust valve coupled to the inlet of the turbine via a first passage and the CIV coupled to the compressor inlet via a second passage and the CIV coupled to the intake passage at a post-compressor location via a third passage.

With reference to FIG. 1, and as one example, cylinder 20 may include a first exhaust valve 122 connected via manifold 55 and pipe 160 to the inlet of turbine 92 of a turbocharger 190 and a compressor inlet valve 112 connected to the inlet of compressor 94 via manifold 59 and pipe 164. Further, the compressor inlet valve 112 may also be fluidically coupled to intake passage 28 downstream of the intake throttle, upstream of the intake manifold, and downstream of the compressor 94 via post-compressor conduit 664 and second ERV 625. Further still, cylinder 20 may not include exhaust valve 132. In some examples, other cylinders of engine 10 may also include two exhaust valves: the first exhaust valve and the compressor inlet valve.

Cylinder operation during the previously described modes of operation may be similar. For example, during the first mode of cylinder operation, the first exhaust valves of each cylinder of engine 10 may be opened throughout the entire exhaust strokes to deliver entire combusted contents (e.g., all exhaust) to the emissions catalyst. During the second mode of operation, CIV 112 of cylinder 20 may be held open for the entire duration of the exhaust stroke in cylinder 20 to transfer all exhaust from cylinder 20 to the post-compressor location via post-compressor conduit 664 and second ERV 625. Further, the first exhaust valve of cylinder 20 may be held closed. Concurrently, within the same engine cycle, the first exhaust valves of the remaining cylinders (e.g., cylinders 22, 24, and 26) may be opened through the entire duration of the respective exhaust strokes to deliver all combusted contents of these remaining cylinders to the exhaust turbine and thereon, to the emissions catalyst. Further still, the CIVs of the remaining cylinders may be held fully closed throughout the respective exhaust strokes in the same engine cycle. During the third mode of operation, all exhaust gases may be drained from cylinder 20 via exhaust valve 122 and compressor inlet valve 112 with a larger portion of gases exiting through exhaust valve 122 and a smaller portion of exhaust exiting through compressor inlet valve 112. The exhaust gases leaving cylinder 20 via compressor inlet valve 112 may be combined with fresh blowthrough air from the intake manifold 27 and may be delivered to the pre-compressor location via pipe 164 and first ERV 125. Other cylinders of the engine may also be operated in the same manner during the third mode.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
during a first condition, directing exhaust from a first cylinder group to a pre-compressor location;
directing exhaust from a second cylinder group to an exhaust turbine; and
during a second condition, directing exhaust gas from the first cylinder group to a post-compressor location.

2. The method of claim 1, wherein the first cylinder group and the second cylinder group are mutually exclusive and comprise distinct cylinders.

3. The method of claim 1, wherein the second condition includes medium engine load conditions.

4. The method of claim 3, further comprising, not directing exhaust from the first cylinder group to either the pre-compressor location or the exhaust turbine.

5. The method of claim 4, wherein exhaust from the second cylinder group is directed to the exhaust turbine and not directed to the pre-compressor location.

6. The method of claim 3, wherein the post-compressor location includes a location downstream of an intake throttle and upstream of an intake manifold.

7. The method of claim 1, wherein the first condition includes high engine load conditions.

8. The method of claim 7, wherein directing exhaust to the pre-compressor location includes directing a combination of blowthrough intake air and residual exhaust gases towards an end of an exhaust stroke in each of the first cylinder group and the second cylinder group.

9. The method of claim 8, wherein directing the combination of blowthrough intake air and residual exhaust gases towards the end of the exhaust stroke in each of the first cylinder group and the second cylinder group includes providing a positive valve overlap between at least one intake valve and one corresponding exhaust valve of each cylinder in each of the first cylinder group and the second cylinder group.

10. The method of claim 7, further comprising not directing exhaust from either the first cylinder group or the second cylinder group to the post-compressor location.

11. The method of claim 1, wherein directing exhaust includes selectively opening one or more exhaust valves of each of the first cylinder group and the second cylinder group, and wherein selectively opening includes actuating a cam profile switching device including cam lobes coupled to each of the one or more exhaust valves to vary a timing of opening and a duration of opening of each of the one or more exhaust valves.

12. A method for an engine, comprising:
during a first condition, recirculating a combination of residual exhaust gases and blowthrough air from a plurality of cylinders of the engine to upstream of a compressor in a first engine cycle; and
during a second condition, recirculating all exhaust from only a subset of the plurality of cylinders to downstream of the compressor and delivering exhaust gases from remaining cylinders to an exhaust turbine in a second engine cycle.

13. The method of claim 12, wherein the first condition includes high engine load conditions and the second condition includes medium engine load conditions.

14. The method of claim 12, further comprising during the first condition, delivering a first blowdown portion of exhaust gases to an exhaust turbine, and delivering a second scavenging portion of exhaust gases to an emission control device from the plurality of cylinders.

15. The method of claim 14, wherein the first blowdown portion of exhaust gases is delivered to the exhaust turbine via a first exhaust valve of each of the plurality of cylinders, and wherein the second scavenging portion of exhaust gases is delivered to the emission control device via a second exhaust valve of each of the plurality of cylinders.

16. The method of claim 15, wherein the combination of residual exhaust gases and blowthrough air is delivered to a location upstream of the compressor via a third exhaust valve of each of the plurality of cylinders.

17. The method of claim 16, further comprising during the second condition, delivering a first blowdown portion of exhaust gases to the exhaust turbine, and delivering a second scavenging portion of exhaust gases to an emission control device from the remaining cylinders.

18. A system, comprising:
an engine having an intake manifold and an exhaust manifold, the exhaust manifold fluidically coupled to an emissions control device;
an intake throttle positioned in an intake passage coupled upstream of the intake manifold;
a turbocharger including an intake compressor driven by an exhaust turbine;
a plurality of cylinders each including a first exhaust valve, a second exhaust valve, and a third exhaust valve;
a first exhaust passage fluidically coupling the first exhaust valve directly to only a turbine of the turbocharger;
a second exhaust passage fluidically coupling the second exhaust valve directly to only an emissions control device;
a third passage fluidically coupling the third exhaust valve directly to only an inlet of the intake compressor;
a fourth passage fluidically coupling the third exhaust valve directly to the intake passage, downstream of the intake compressor, downstream of the intake throttle, and upstream of the intake manifold;
a first exhaust recirculation valve positioned within the third passage;
a second exhaust recirculation valve positioned within the fourth passage; and
a cam profile switching system coupled to each of the first exhaust valve, the second exhaust valve, and the third exhaust valve of each of the plurality of cylinders.

19. The system of claim 18, further comprising a controller with computer readable instructions stored in non-transitory memory for:
operating the plurality of cylinders in a first mode with the second exhaust valve open and each of the first exhaust valve and the third exhaust valve closed to recirculate all exhaust to the emissions control device;
operating the plurality of cylinders in a second mode wherein a subset of the plurality of cylinders is operated with the third exhaust valve open and each of the first exhaust valve and the second exhaust valve closed to recirculate all exhaust to the intake manifold, downstream of the intake compressor and the remaining of the plurality of cylinders are operated with each of the first exhaust valve and the second exhaust valve open and the third exhaust valve closed to deliver portions of exhaust to the exhaust turbine and the emissions control device; and
operating the plurality of cylinders in a third mode with each of the first exhaust valve, the second exhaust valve, and the third exhaust valve open to divert portions of exhaust to each of the inlet of the intake compressor, the emissions control device, and the exhaust turbine.

20. The system of claim 19, wherein the controller includes further instructions for:
closing each of the first exhaust recirculation valve and the second exhaust recirculation valve when the plurality of cylinders is operating in the first mode;
closing the first exhaust recirculation valve and opening the second exhaust recirculation valve when the plurality of cylinders is operating in the second mode; and
opening the first exhaust recirculation valve and closing the second exhaust recirculation valve when the plurality of cylinders is operating in the third mode.

* * * * *